United States Patent
Boncato et al.

(10) Patent No.: US 11,569,748 B2
(45) Date of Patent: Jan. 31, 2023

(54) INTERPOLATION CONTROL FOR BALANCING CURRENTS IN INTERLEAVED POWER CONVERTERS

(71) Applicant: Astec International Limited, Kowloon (HK)

(72) Inventors: Yancy Fontanilla Boncato, Metro Manila (PH); Ronnie Bachiller Gozun, Metro Manila (PH)

(73) Assignee: Astec International Limited, Kowloon (HK)

( * ) Notice: Subject to any disclaimer, the term of this patent is extended or adjusted under 35 U.S.C. 154(b) by 0 days.

(21) Appl. No.: 17/455,248

(22) Filed: Nov. 17, 2021

(65) Prior Publication Data

US 2022/0077785 A1   Mar. 10, 2022

Related U.S. Application Data

(63) Continuation of application No. 16/941,153, filed on Jul. 28, 2020, now Pat. No. 11,196,345.

(51) Int. Cl.
*H02M 3/158* (2006.01)
*H02M 1/088* (2006.01)
(Continued)

(52) U.S. Cl.
CPC ....... *H02M 3/1584* (2013.01); *H02M 1/4225* (2013.01); *H02M 3/157* (2013.01);
(Continued)

(58) Field of Classification Search
CPC .. H02M 1/0043; H02M 1/0077; H02M 1/088; H02M 7/493; H02M 3/1586
See application file for complete search history.

(56) References Cited

U.S. PATENT DOCUMENTS 6,084,790 A * 7/2000 Wong ............... H02M 3/1584
                                                    323/272
7,282,896 B2 * 10/2007 Moussaoui ......... H02M 3/1584
                                                    323/272
(Continued)

FOREIGN PATENT DOCUMENTS

CN     101534060 B    6/2012
CN     103081321 B    1/2016
(Continued)

OTHER PUBLICATIONS

Extended European Search Report for EP Application No. 21187280.9, dated Dec. 10, 2021; 8 pages.
(Continued)

*Primary Examiner* — Gary A Nash

(57) ABSTRACT

An interleaved power converter includes a control circuit and multiple phase-shifted subconverters each having at least one power switch. The control circuit is coupled to the subconverters for controlling the power switches to balance currents in the subconverters over multiple periods. The control circuit includes a current compensator configured to determine a first duty cycle multiple times over the multiple periods, generate a PWM control signal having a present value of the first duty cycle for controlling the power switch of one of the subconverters during a period, determine a second duty cycle based on the present value of the first duty cycle and a previous value of the first duty cycle, and generate another PWM control signal having the second duty cycle for controlling the power switch of another one of the subconverters during the period. Other example power converters and control circuits are also disclosed.

20 Claims, 18 Drawing Sheets

(51) Int. Cl.
*H02M 7/493* (2007.01)
*H02M 1/42* (2007.01)
*H02M 3/157* (2006.01)
*H02M 1/00* (2006.01)

(52) U.S. Cl.
CPC ........ *H02M 1/0043* (2021.05); *H02M 1/0074* (2021.05); *H02M 1/0077* (2021.05); *H02M 1/088* (2013.01); *H02M 3/158* (2013.01); *H02M 3/1586* (2021.05); *H02M 7/493* (2013.01)

(56) References Cited

U.S. PATENT DOCUMENTS

| | | | |
|---|---|---|---|
| 7,586,769 B2 | 9/2009 | Galkwad et al. | |
| 8,547,076 B1* | 10/2013 | Ikriannikov | H02M 3/1584 323/283 |
| 10,020,738 B2* | 7/2018 | Cai | H02M 1/14 |
| 10,027,220 B2* | 7/2018 | Ng | H02M 1/42 |
| 10,177,654 B1 | 1/2019 | Chang et al. | |
| 10,312,798 B2 | 6/2019 | Green et al. | |
| 2009/0257257 A1 | 10/2009 | Adragna et al. | |
| 2013/0057239 A1* | 3/2013 | Kalje | H02M 3/1584 323/271 |
| 2013/0194848 A1* | 8/2013 | Bernardinis | H02M 1/4225 363/126 |
| 2013/0293203 A1* | 11/2013 | Chen | H02M 3/1584 323/234 |
| 2018/0034449 A1 | 2/2018 | Hasegawa et al. | |

FOREIGN PATENT DOCUMENTS

| | | |
|---|---|---|
| CN | 104682683 B | 4/2017 |
| CN | 105763094 B | 7/2018 |
| JP | 6243098 B2 | 11/2017 |
| TW | I548191 B | 9/2016 |
| TW | I603571 B | 10/2017 |
| WO | 2019032495 A1 | 2/2019 |
| WO | 2021095208 A1 | 5/2021 |

OTHER PUBLICATIONS

Office Action and Search Report for Taiwan Application No. 110126741, dated Dec. 22, 2021; 7 pages.
Japan Office Action for Japan Application No. 2021-121320, dated Aug. 2, 2022; 4 pages.

* cited by examiner

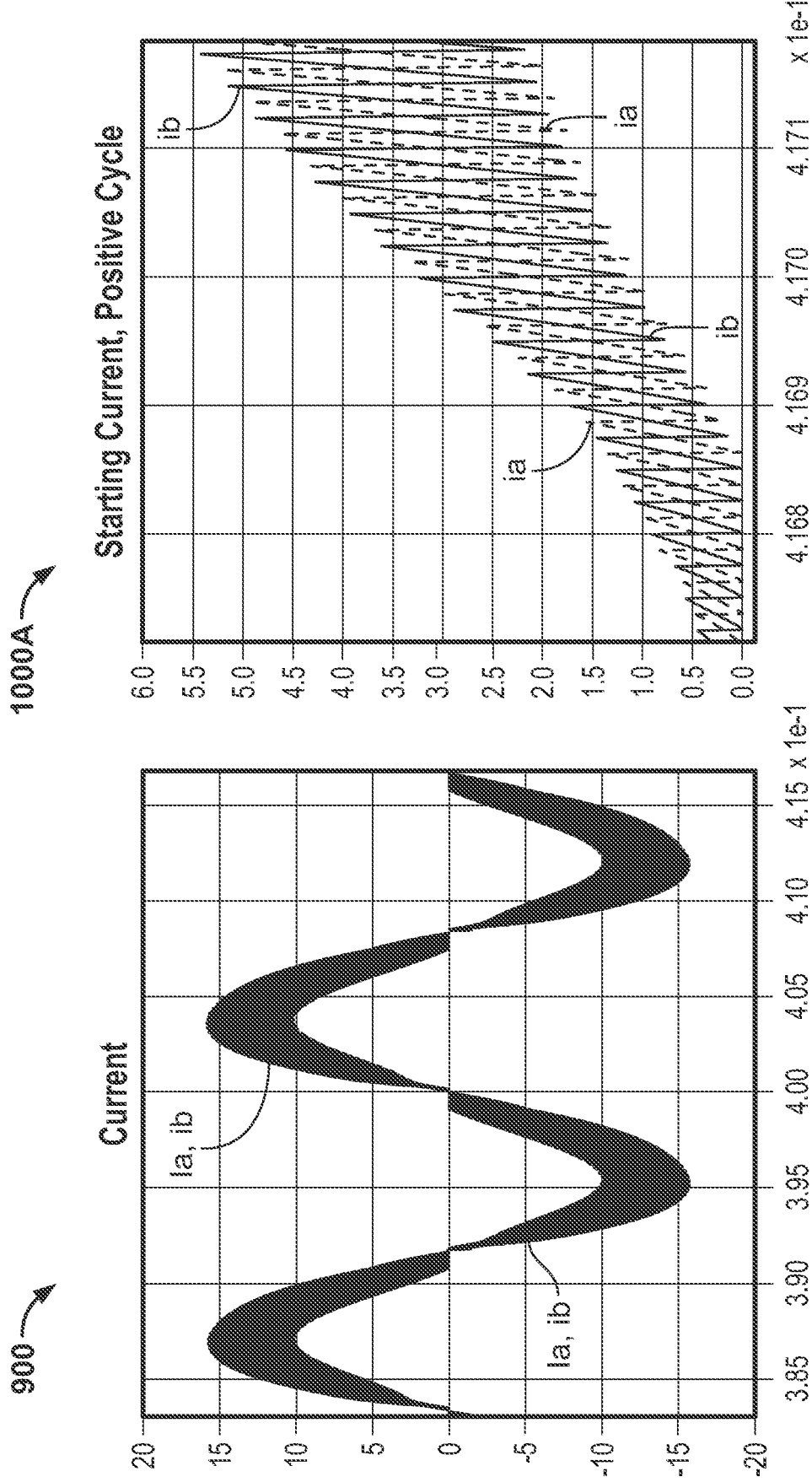

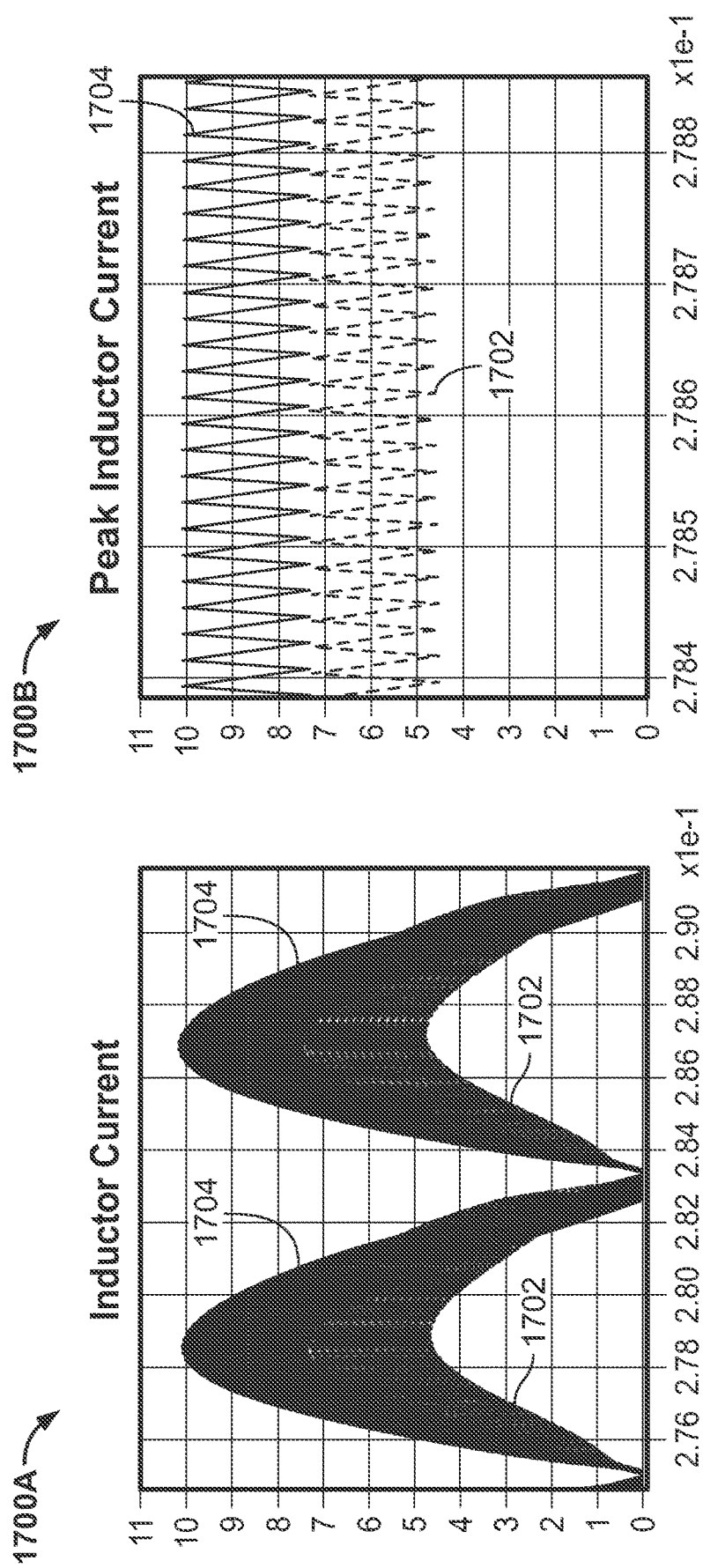

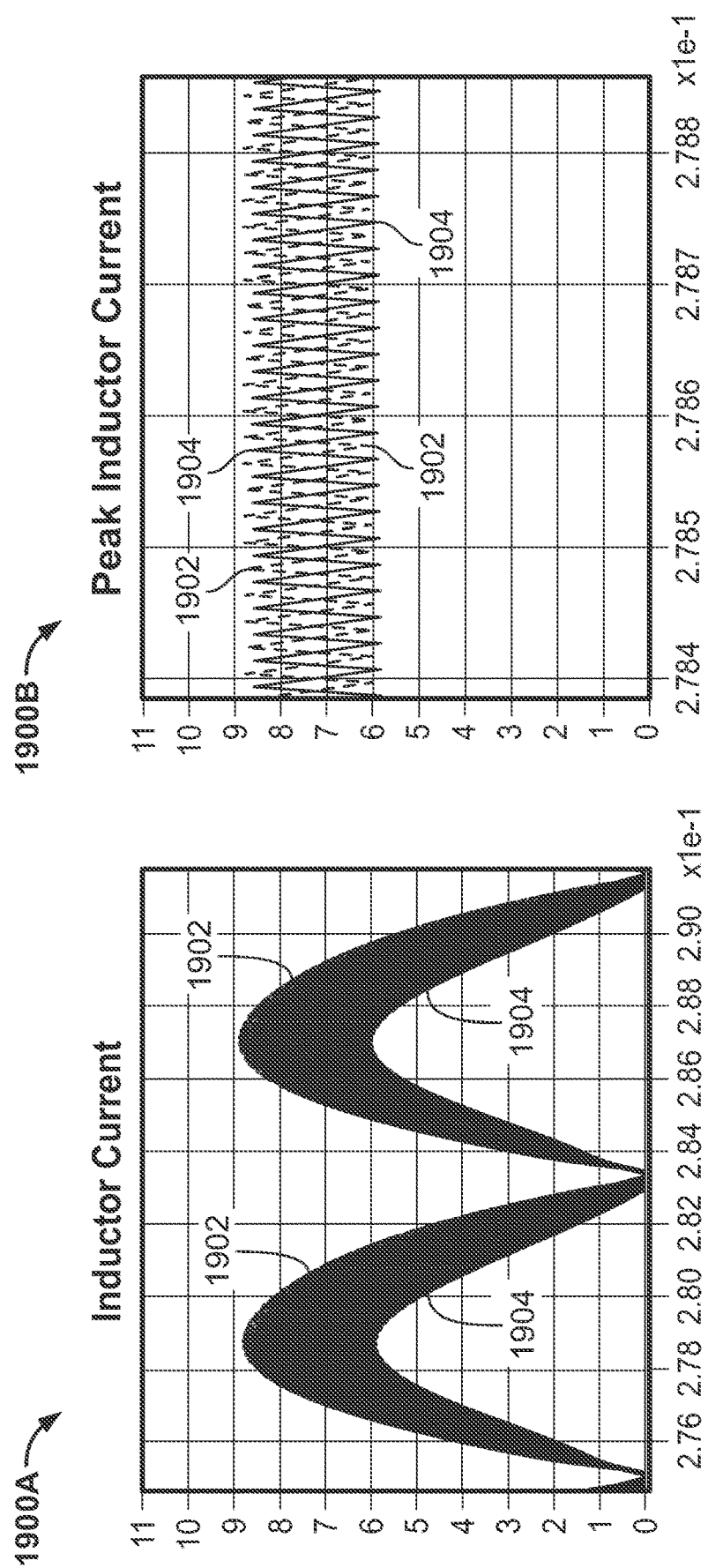

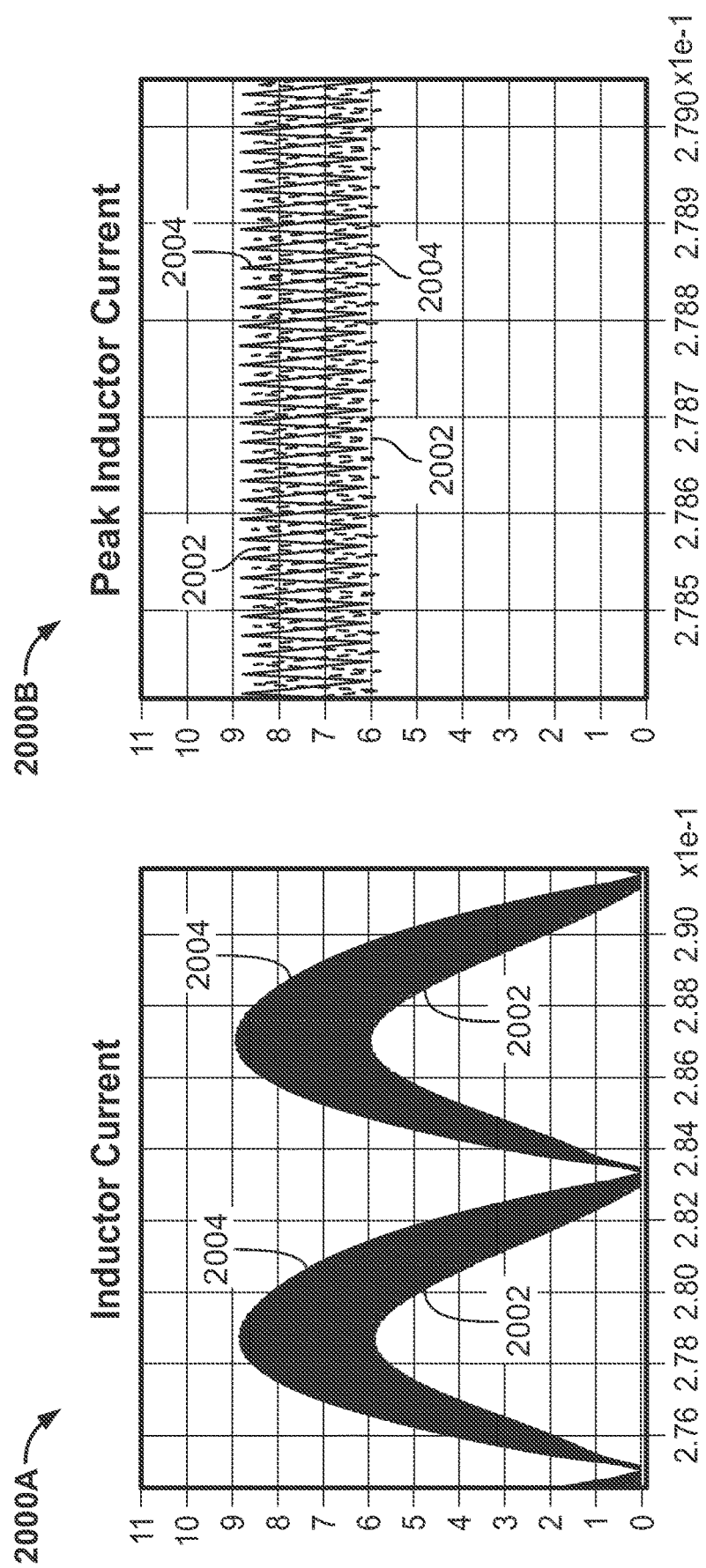

INTERPOLATION CONTROL FOR BALANCING CURRENTS IN INTERLEAVED POWER CONVERTERS

CROSS-REFERENCE TO RELATED APPLICATIONS

This application claims the benefit of and priority to U.S. application Ser. No. 16/941,153 filed Jul. 28, 2020. The entire disclosure of the above application is incorporated herein by reference.

FIELD

The present disclosure relates to interpolation control for balancing currents in interleaved power converters.

BACKGROUND

This section provides background information related to the present disclosure which is not necessarily prior art.

A multiphase power converter commonly includes interleaved PFC boost subconverters and a control circuit for controlling power switches in the subconverters. In some examples, the control circuit may control duty cycles of the power switches to balance rail currents in the subconverters. In such examples, the rail currents may be balanced by employing a split boost inductor, multiple current sensors, and/or multiple current compensators for balancing rail currents. In other examples, the power converter's input voltage and current may be sampled multiple times per cycle, and the control circuit's current compensator may be executed multiple times per cycle to adjust the duty cycles to balance the rail currents.

SUMMARY

This section provides a general summary of the disclosure and is not a comprehensive disclosure of its full scope or all of its features.

According to one aspect of the present disclosure, an interleaved multiphase switching power converter includes a plurality of subconverters and a control circuit. The subconverters include a first subconverter having a power switch and a second subconverter having a power switch. The second subconverter is phase shifted relative to the first subconverter. The control circuit is coupled to the first subconverter and the second subconverter for controlling the power switch of the first subconverter and the power switch of the second subconverter to balance currents in the first subconverter and the second subconverter over multiple periods. The control circuit includes a current compensator configured to determine a first duty cycle multiple times over the multiple periods based on a reference signal and a sensed current in the switching power converter, generate a first PWM control signal having a present value of the first duty cycle for controlling the power switch of the first subconverter during one period of the multiple periods, determine a second duty cycle based on the present value of the first duty cycle and a previous value of the first duty cycle, and generate a second PWM control signal having the second duty cycle for controlling the power switch of the second subconverter during said one period.

According to another aspect of the present disclosure, a control circuit for controlling an interleaved multiphase switching power converter is disclosed. The switching power converter includes at least a first subconverter having a power switch and a second subconverter having a power switch. The second subconverter is phase shifted relative to the first subconverter. The control circuit is configured to couple to the first subconverter and the second subconverter for controlling the power switch of the first subconverter and the power switch of the second subconverter to balance currents in the first subconverter and the second subconverter over multiple periods. The control circuit includes a current compensator configured to determine a first duty cycle multiple times over the multiple periods based on a reference signal and a sensed current in the switching power converter, generate a first PWM control signal having a present value of the first duty cycle for controlling the power switch of the first subconverter during one period of the multiple periods, determine a second duty cycle based on the present value of the first duty cycle and a previous value of the first duty cycle, and generate a second PWM control signal having the second duty cycle for controlling the power switch of the second subconverter during said one period.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 4:
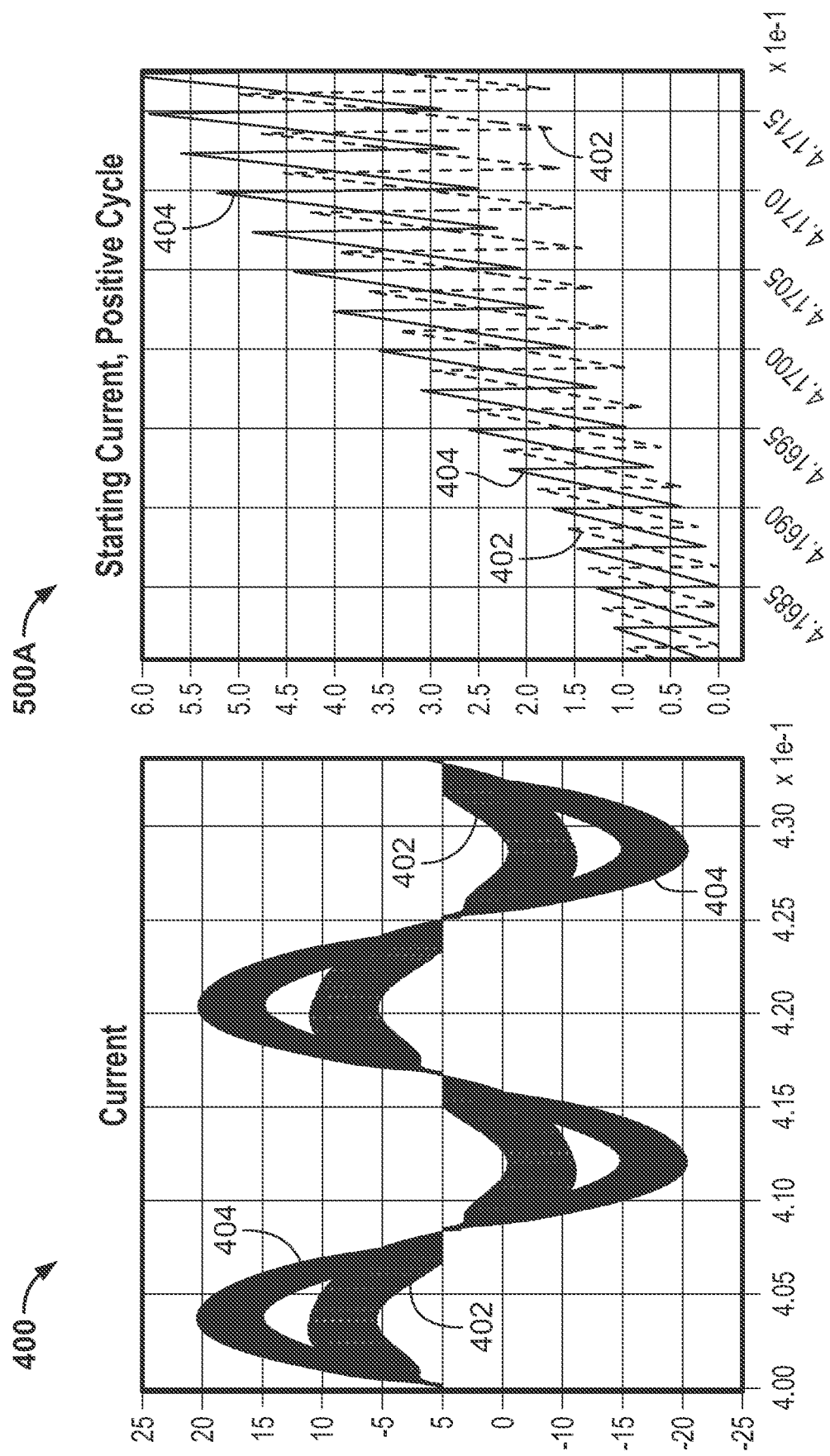
FIG. 4 is a graph showing unbalanced rail currents in two subconverters when using conventional control techniques.
Figure 5:
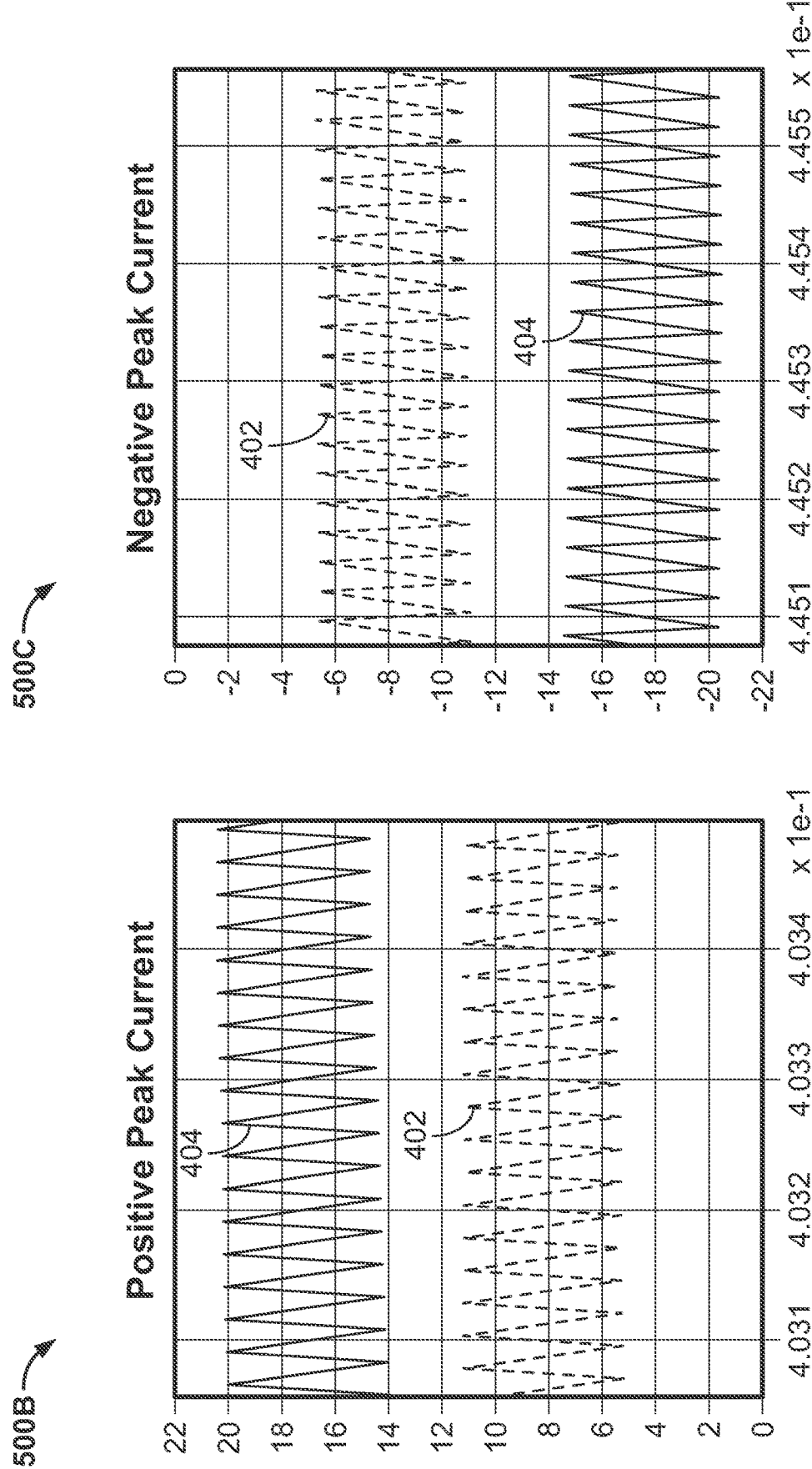

FIGS. 5A-C are graphs showing enlarged portions of the unbalanced rail currents of FIG. 4 during a start of a positive cycle, at positive peak values, and at negative peak values.

Figure 6:
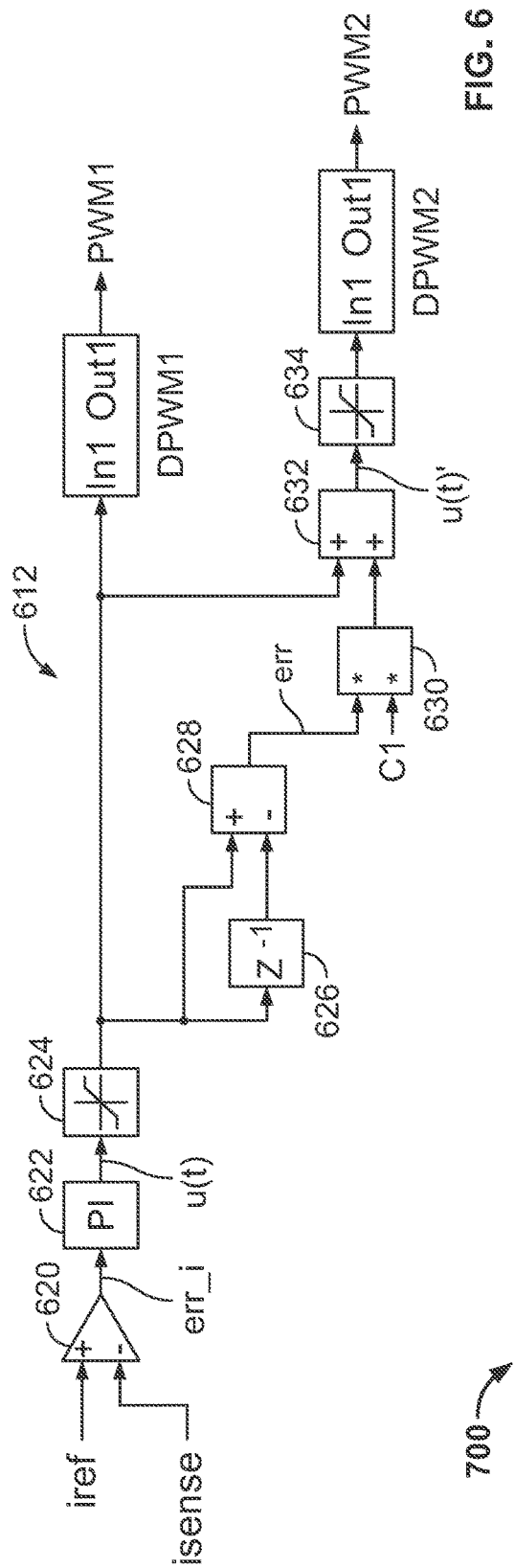

FIG. 6 is a block diagram of a control circuit's current compensator implementing interpolation-based control for determining duty cycles to balance rail currents in two subconverters according to another example embodiment.

Figure 7:
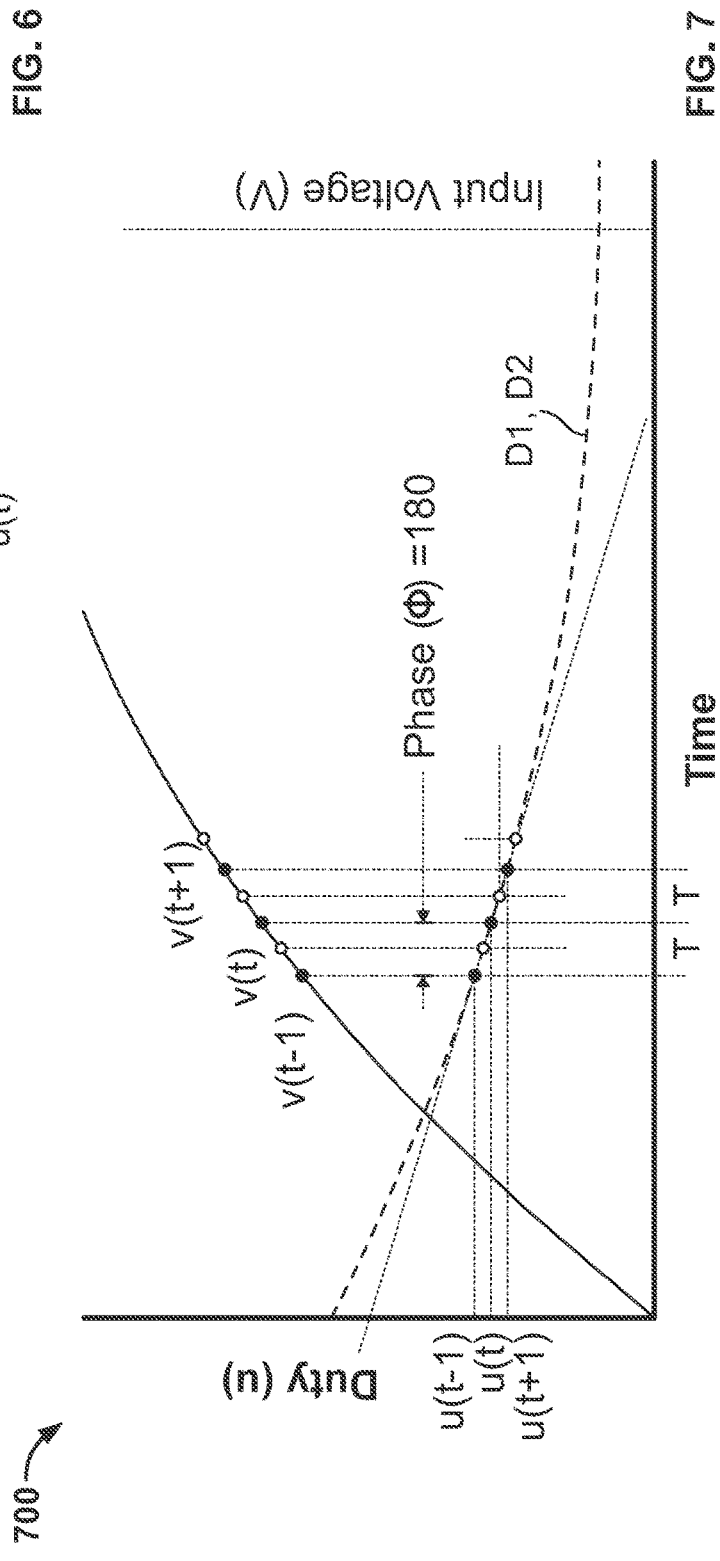

FIG. 7 is a graph showing an input voltage and duty cycle values for the subconverters controlled by the current compensator of FIG. 6 when implementing interpolation-based control according to yet another example embodiment.

Figure 8:
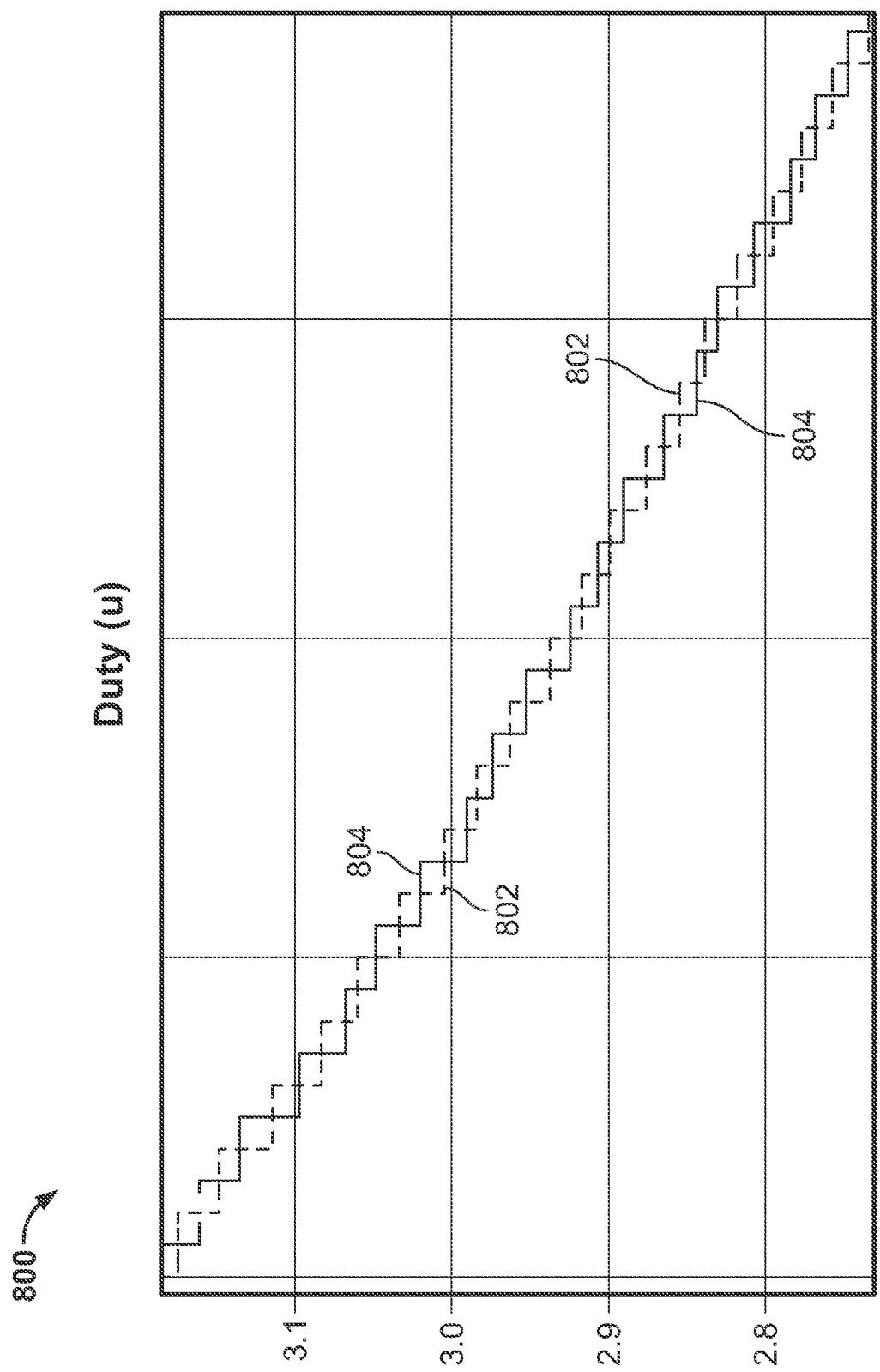

FIG. 8 is a graph showing duty cycle values for two subconverters when using interpolation-based control according to another example embodiment.

FIG. 9 is a graph showing balanced rail currents in two subconverters when implementing interpolation-based control according to another example embodiment.

Figures 10B, 10C:
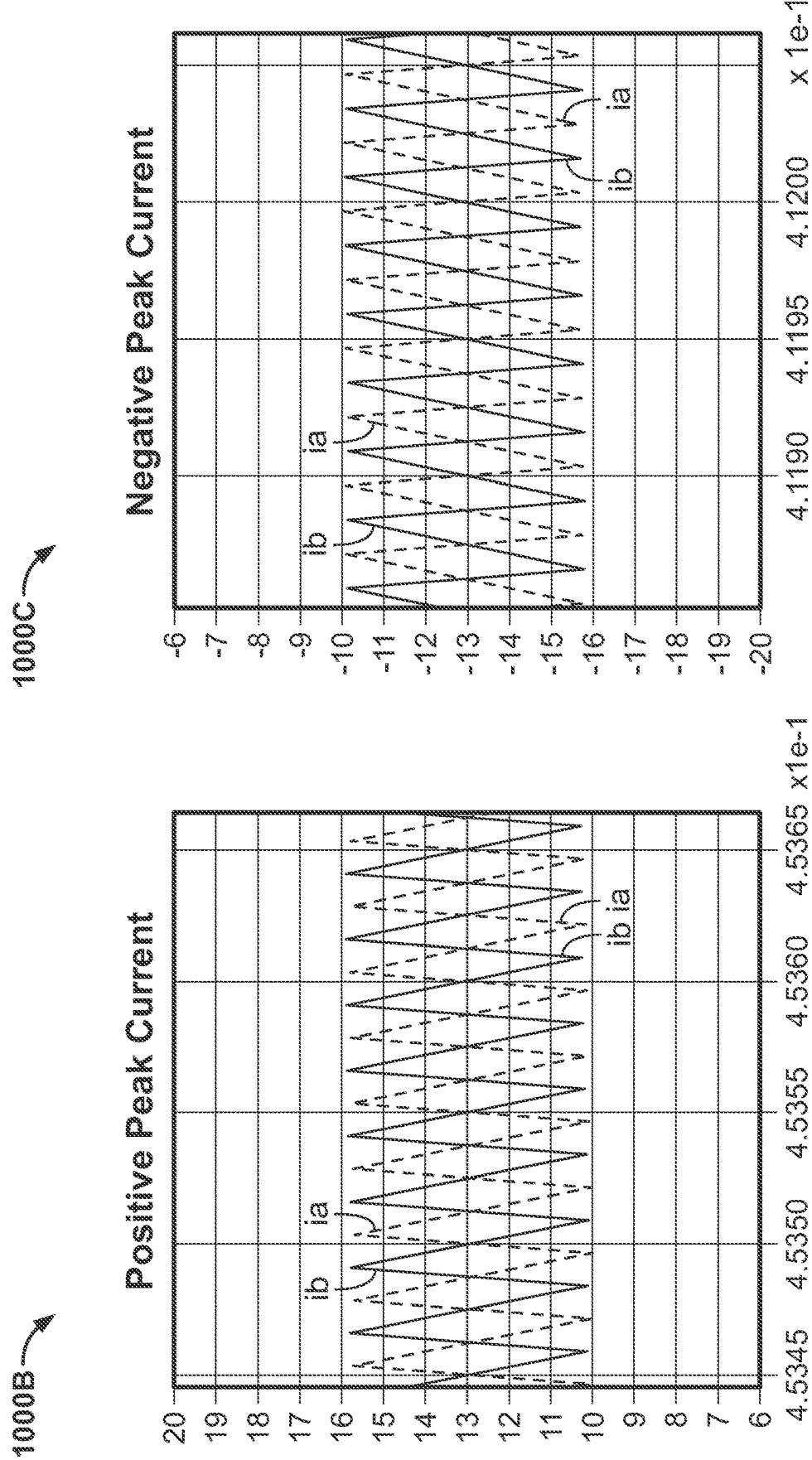

FIGS. 10A-C are graphs showing enlarged portions of the balanced rail currents of FIG. 9 during a start of a positive cycle, at positive peak values, and at negative peak values.

Figure 11:
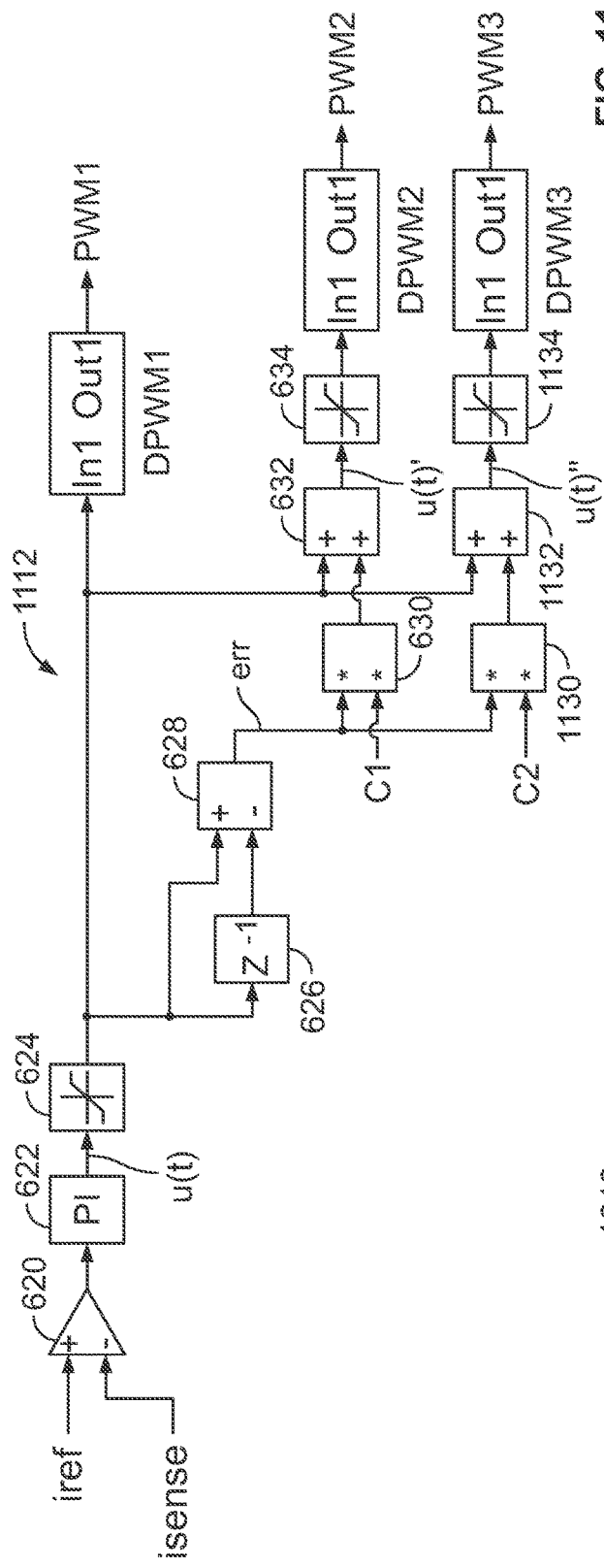

FIG. 11 is a block diagram of a control circuit's current compensator implementing interpolation-based control for balancing rail currents in three subconverters according to yet another example embodiment.

Figure 12:
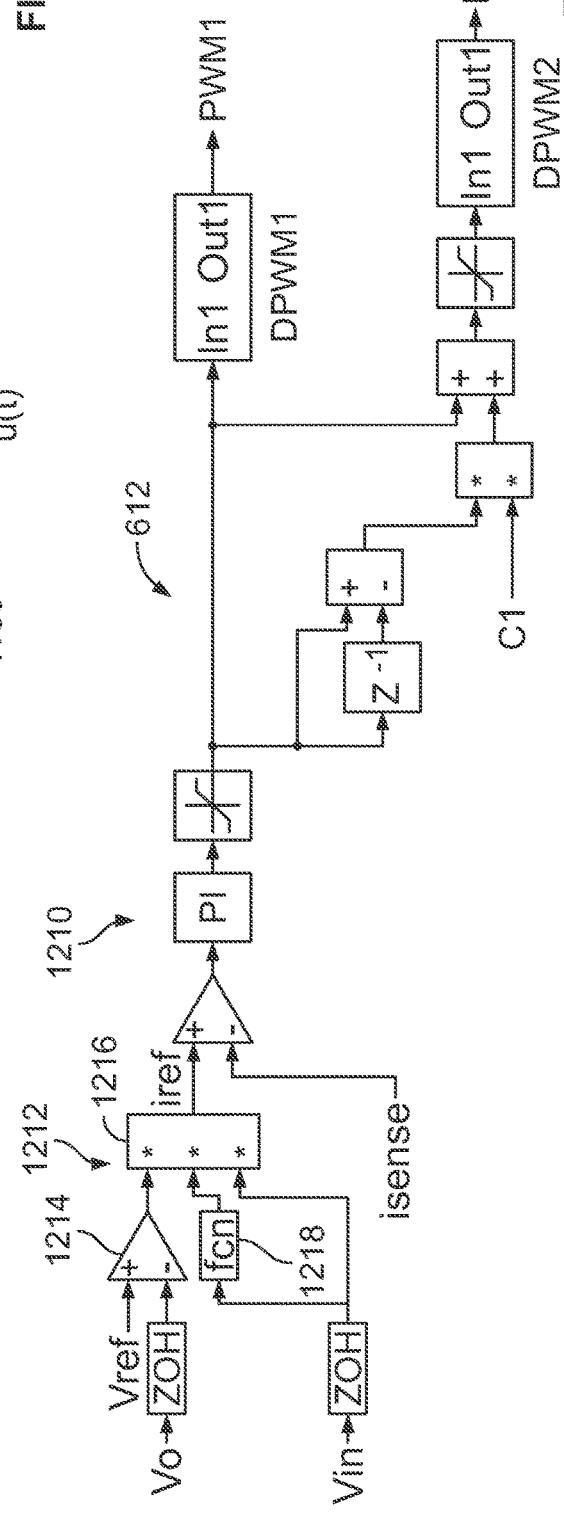

FIG. 12 is a block diagram of a control circuit including a voltage compensator and a current compensator implementing interpolation-based control for balancing rail currents in two subconverters according to another example embodiment.

Figure 13B:
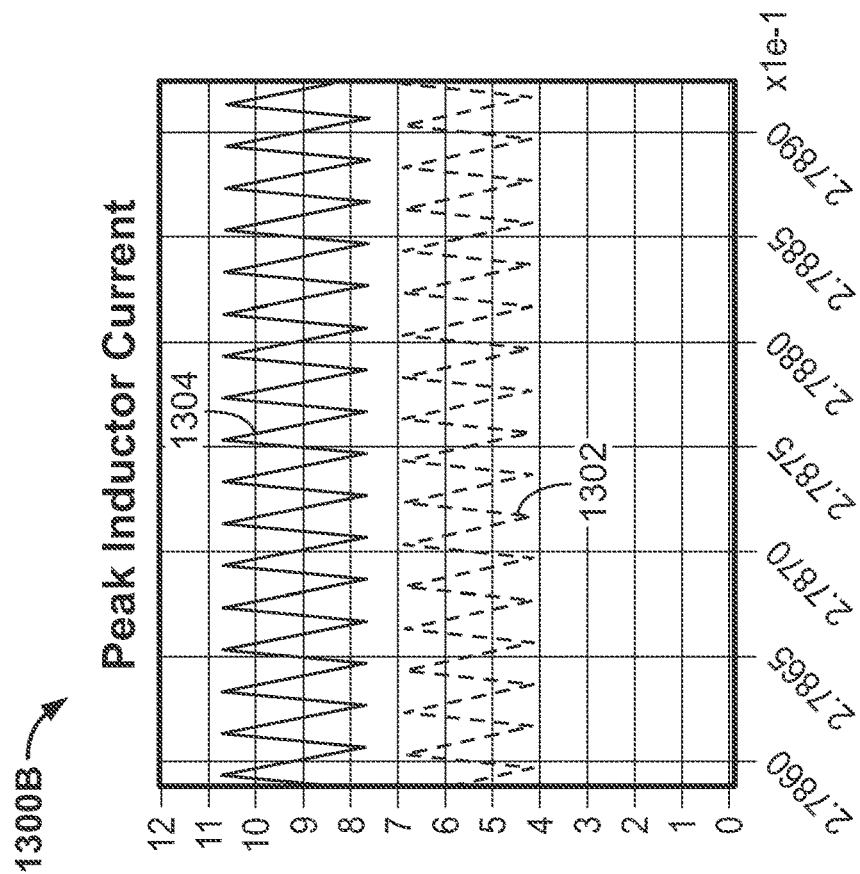
Figure 13A:
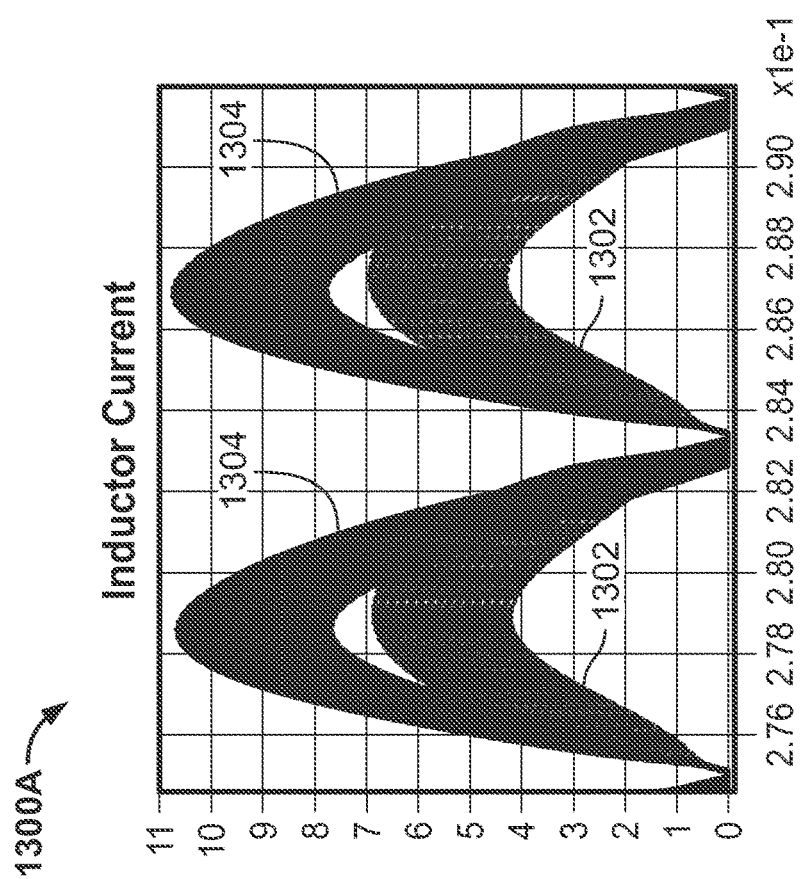
Figure 14B:
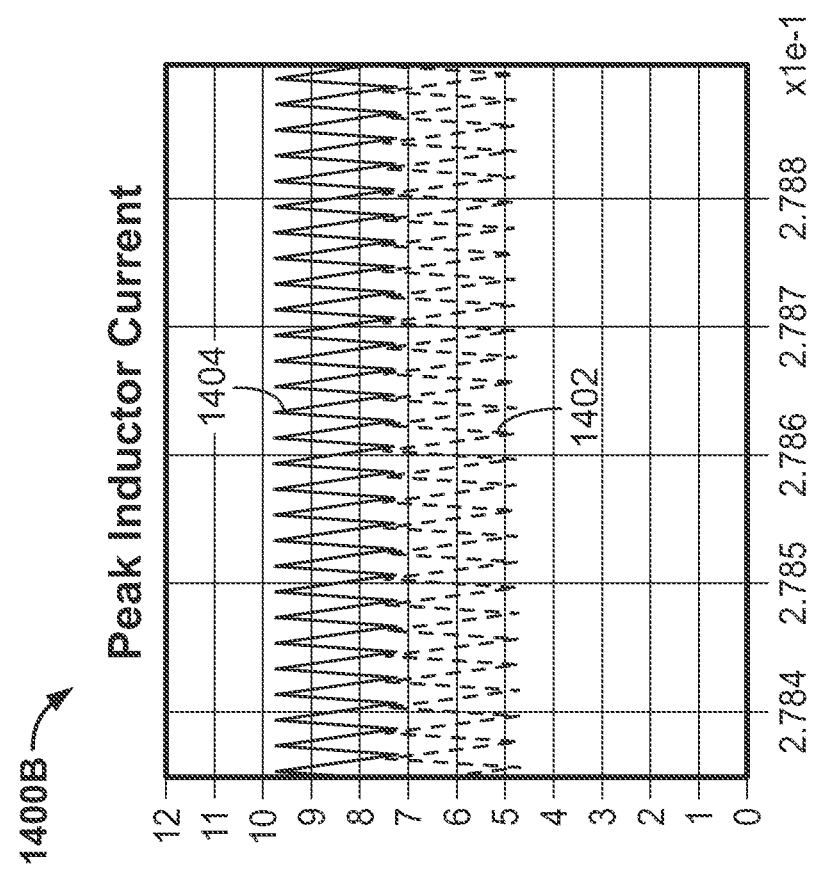
Figure 14A:
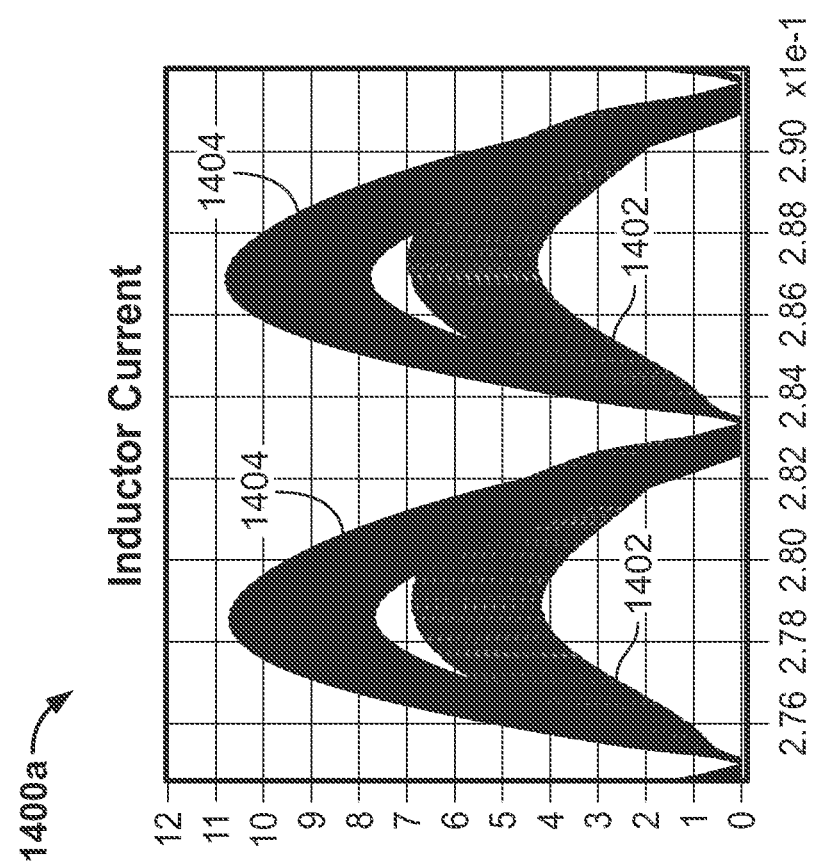

FIGS. 13A and 14A are graphs showing unbalanced rail currents in two subconverters having inductors with values differing by ten percent when using conventional control techniques.

FIGS. 13B and 14B are graphs showing enlarged portions of the unbalanced rail currents of FIGS. 13A and 14A, respectively, at positive peak values.

Figure 15B:
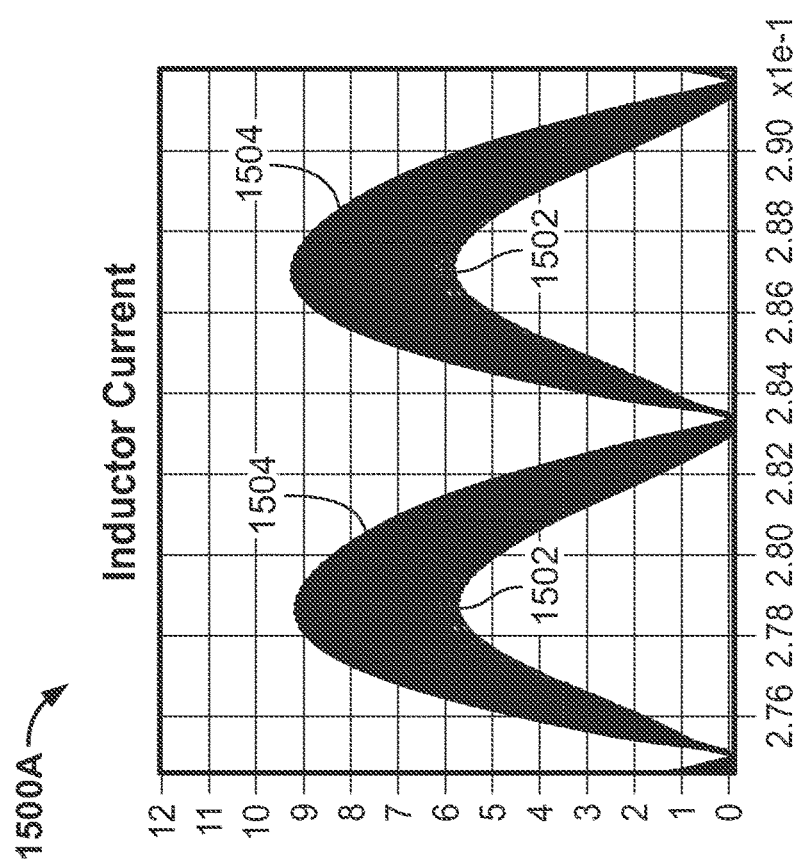
Figure 15A:
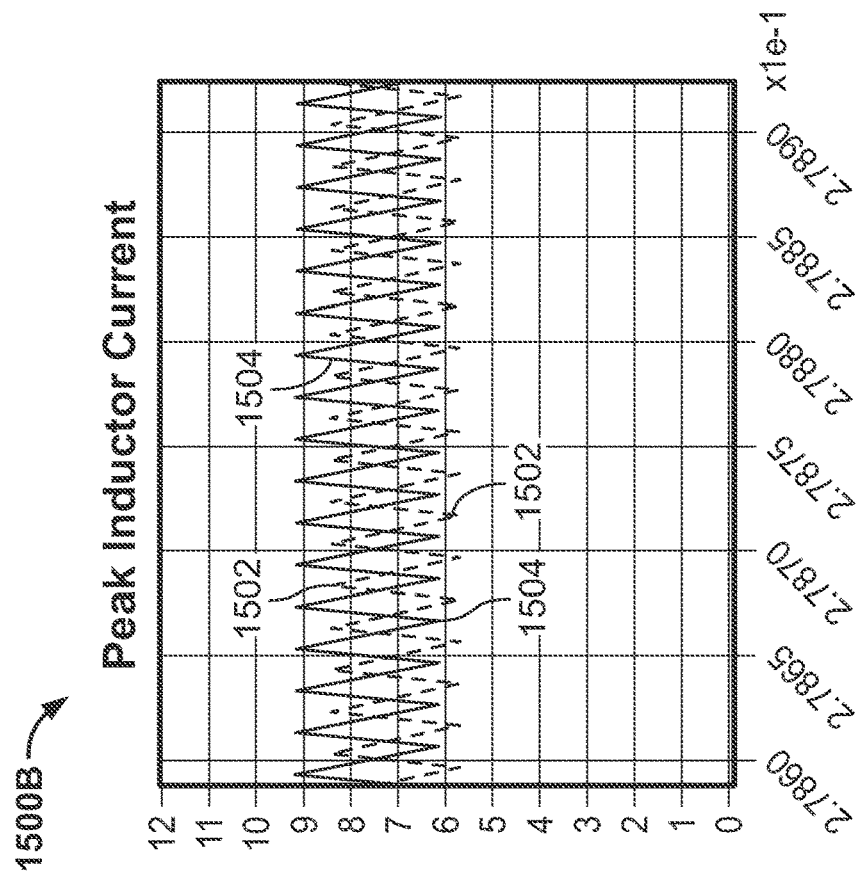
Figure 16B:
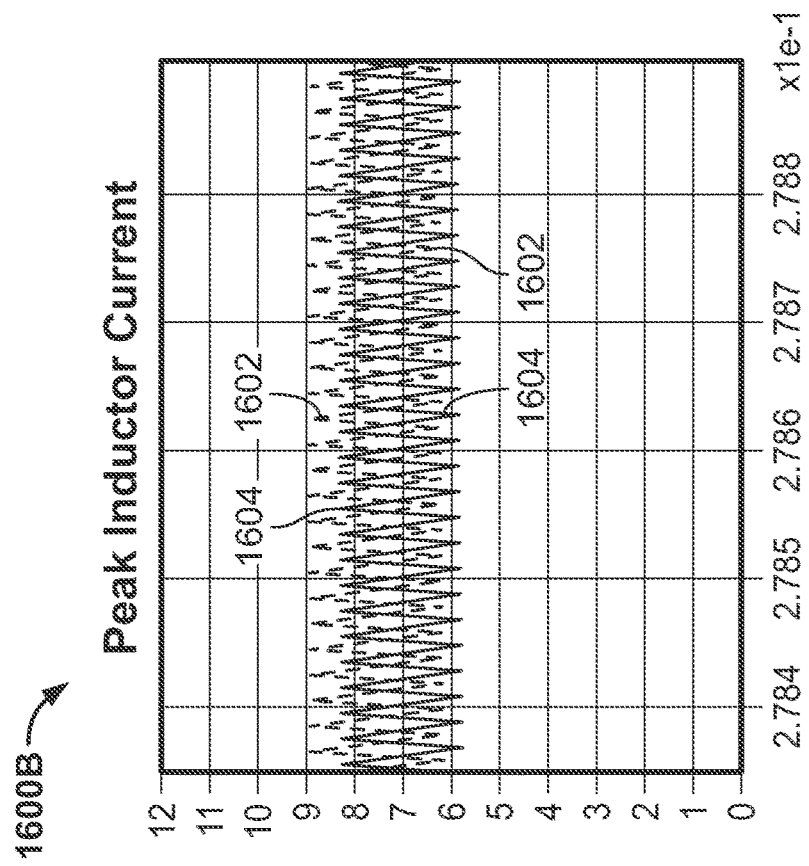
Figure 16A:
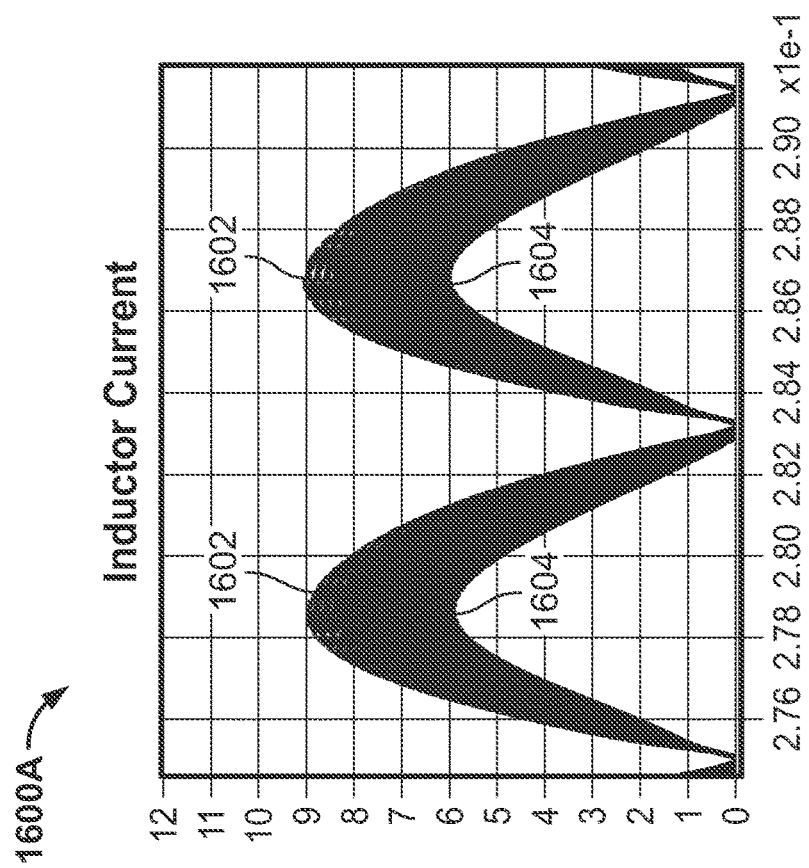

FIGS. 15A and 16A are graphs showing balanced rail currents in two subconverters having inductors with values differing by ten percent when implementing interpolation-based control according to another example embodiment.

FIGS. 15B and 16B are graphs showing enlarged portions of the unbalanced rail currents of FIGS. 15A and 16A, respectively, at positive peak values.

Figure 18B:
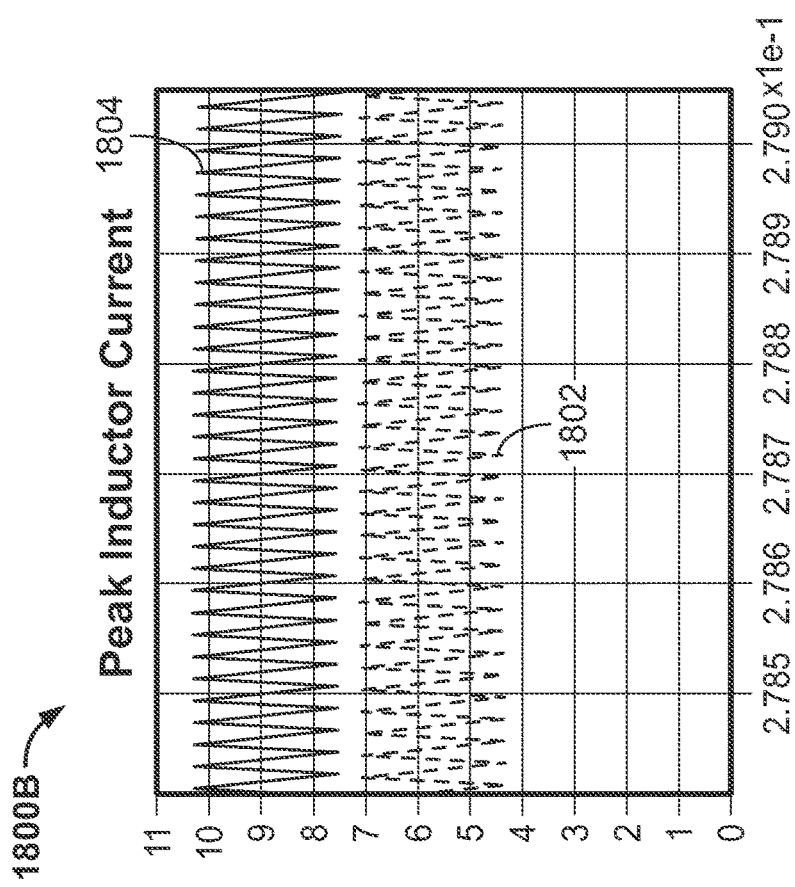
Figure 18A:
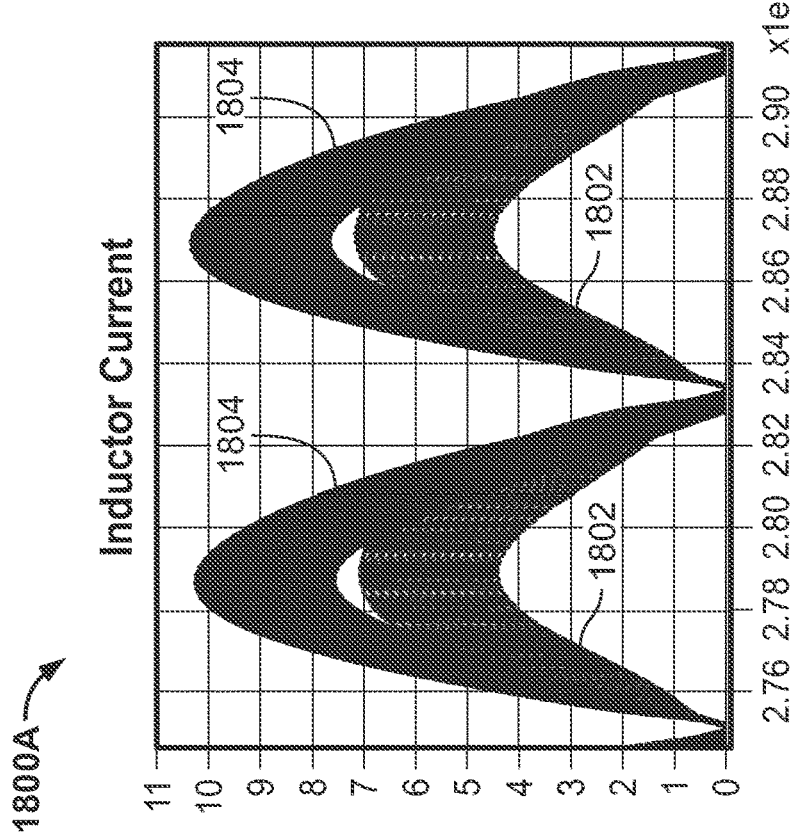

FIGS. 17A and 18A are graphs showing unbalanced rail currents in two subconverters having resistance values differing by ten milliohms when using conventional control techniques.

FIGS. 17B and 18B are graphs showing enlarged portions of the unbalanced rail currents of FIGS. 17A and 18A, respectively, at positive peak values.

FIGS. 19A and 20A are graphs showing balanced rail currents in two subconverters having resistance values differing by ten milliohms when implementing interpolation-based control according to yet another example embodiment.

FIGS. 19B and 20B are graphs showing enlarged portions of the unbalanced rail currents of FIGS. 19A and 20A, respectively, at positive peak values.

Figure 21:
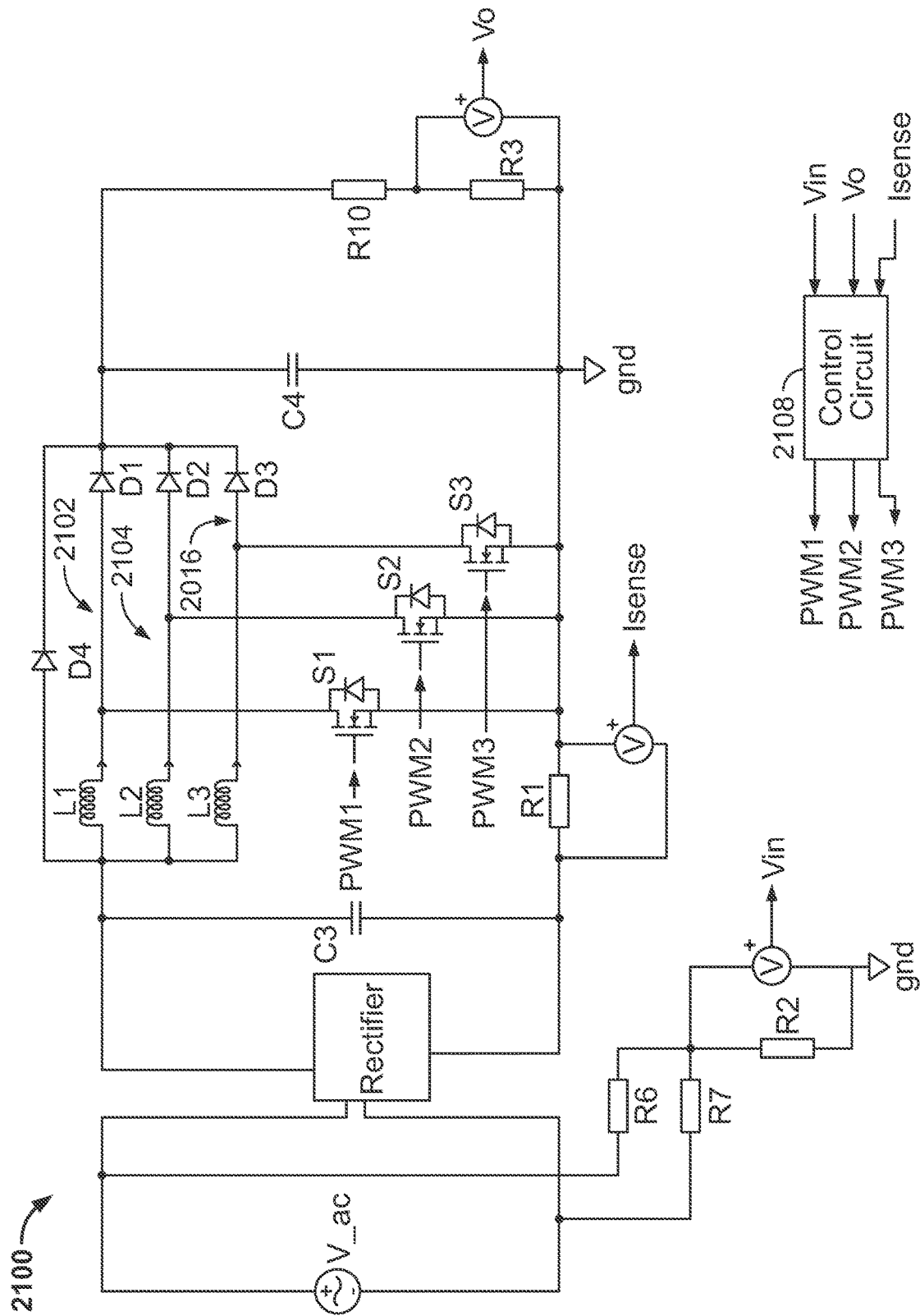

FIG. 21 is a schematic diagram of an interleaved multiphase switching power converter including three subconverters having power switches and a control circuit employing interpolation-based control for balancing rail currents in the subconverters according to another example embodiment.

Corresponding reference numerals indicate corresponding (but not necessarily identical) parts and/or features throughout the several views of the drawings.

DETAILED DESCRIPTION

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

Figure 1:
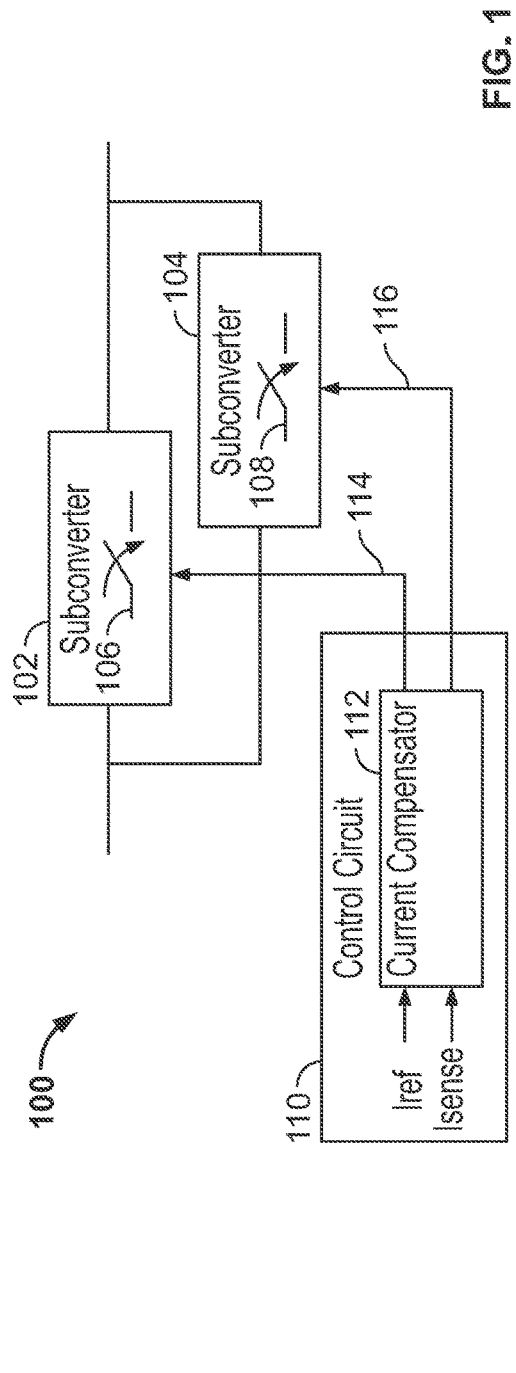
FIG. 1 is a block diagram of an interleaved multiphase switching power converter including two subconverters having power switches and a control circuit employing interpolation-based control for determining duty cycles of the power switches to balance rail currents in the subconverters according to one example embodiment of the present disclosure.

An interleaved multiphase switching power converter according to one example embodiment of the present disclosure is illustrated in FIG. 1 and indicated generally by reference number 100. As shown in FIG. 1, the interleaved multiphase switching power converter 100 includes phase-shifted subconverters 102, 104 having power switches 106, 108, and a control circuit 110 coupled to the subconverters 102, 104 for controlling the power switches 106, 108 to balance currents in the subconverters 102, 104 over multiple periods. The control circuit 110 includes a current compensator 112 configured to determine a duty cycle D1 multiple times over the multiple periods based on a reference signal Iref and a sensed current Isense in the switching power converter 100, generate a PWM control signal 114 having a present value of the duty cycle D1 for controlling the power switch 106 of the subconverter 102 during a period of the multiple periods, determine another duty cycle D2 based on the present value of the duty cycle D1 and a previous value of the duty cycle D1, and generate a PWM control signal 116 having the duty cycle D2 for controlling the power switch 108 of the subconverter 104 during the period.

The control circuit 110 employs an interpolation-based control for balancing rail currents in the subconverters 102, 104 when the subconverters are operated with average current mode control. For example, the control circuit 110 determines the duty cycle D2 for controlling the subconverter 104 based on known values of the duty cycle D1. In such examples, the interpolation-based control mitigates current imbalances between the subconverter 102 (e.g., a master subconverter) and the subconverter 104 (e.g., a slave subconverter) caused by, for example, control signal delays, control peripheral delays, differing inductance values in the subconverters 102, 104, mismatched PCB traces in the subconverters 102, 104, etc. As such, rail currents in the subconverters 102, 104 may be phase synchronized, and have a similar wave shape and amplitude. By balancing rail currents in the subconverters 102, 104, heat may be spread and dissipated evenly in the power switches 106, 108 while effectively reducing ripple current by a factor inversely proportional to number of subconverters.

Figure 2:
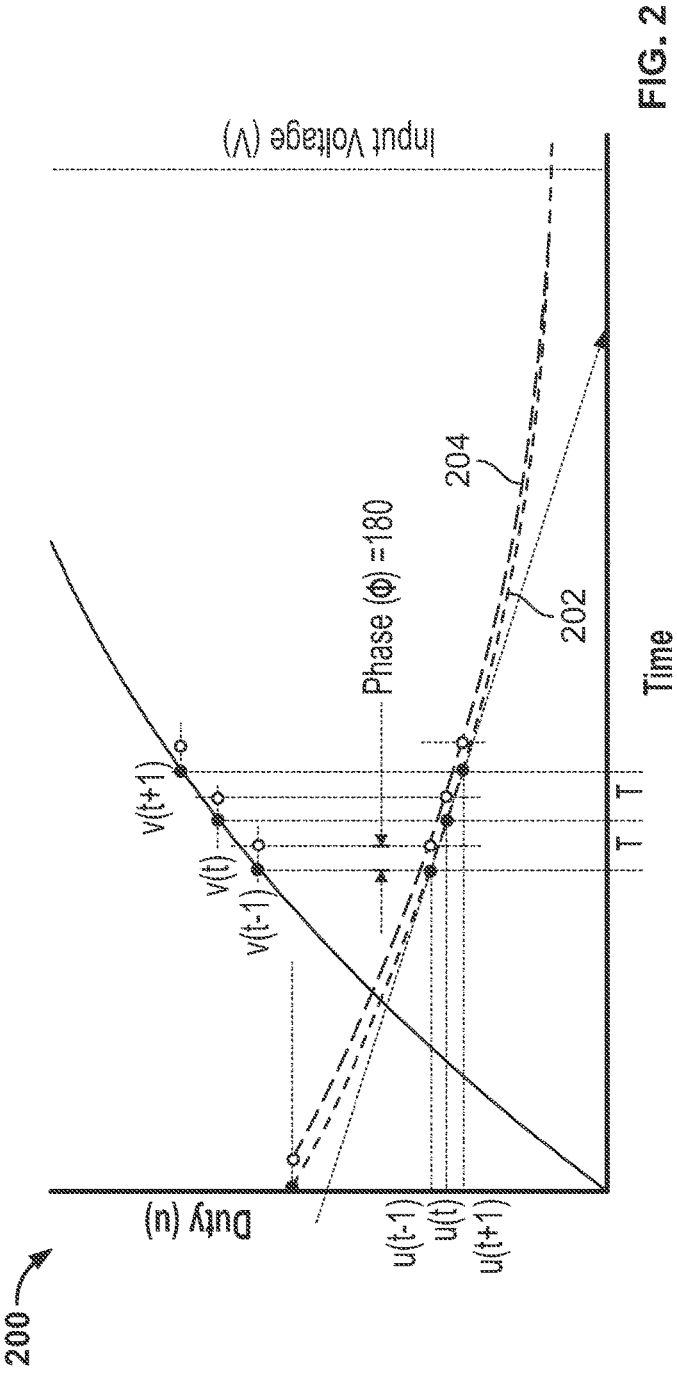
FIG. 2 is a graph showing an input voltage and duty cycle values for two subconverters when using conventional control techniques.

Conventionally, duty cycles of control signals for controlling different subconverters are updated based on the same current and voltage values. For example, in average current mode, the duty cycles of the control signals are computed based on an error between a current reference (e.g., Iref(t)) and a sensed current (e.g., an input current Iint(t)), both changing over time. The current reference Iref(t) is greatly influenced by the input voltage V(t). For example, FIG. 2 illustrates a graph 200 showing duty cycles 202, 204 for two subconverters employing conventional control techniques and the input voltage V over multiple periodic cycles. In this example, PWM modules for generating PWM control signals operate with a 180-degree phase shift φ. As shown in FIG. 2, an increasing input voltage V(t) (e.g., during the upward AC slope of the input voltage) results in decreasing duty cycle values (u). The duty cycle values continue to decrease until the input voltage V(t) reaches a peak voltage value. During the downward AC slope of the input voltage (not shown in FIG. 2), the duty cycle values increase until the input voltage V(t) reaches a minimum voltage value.

A compensator updates the duty cycle values (u) for the subconverters based on the same input voltage V(t) one time per cycle T. As such, when the compensator updates the duty cycle values (u), the duty cycle value 204 for one subconverter is shifted and overcompensated relative to the duty cycle value 202 for the other subconverter. For example, and as shown in FIG. 2, the duty cycle values 202, 204 take different paths because the input voltage V changes while the updated duty cycle values (u) remain the same through each cycle T. As a result, one subconverter may store more energy than the other subconverter thereby causing an imbalance between rail currents (e.g., inductor currents) in the subconverters.

For example, FIGS. 3, 4, and 5A-C illustrate graphs 300, 400, 500A, 500B, 500C of duty cycle values 302, 304 and rail currents 402, 404 in two subconverters of a power converter employing conventional control techniques. Specifically, the graph 300 illustrates the duty cycle values 302, 304 over time when an input voltage of the power converter is in its upward slope of one AC cycle, and the graph 400 illustrates the rail currents 402, 404 over two AC cycles. The graphs 500A, 500B, 500C show enlarged portions of the rail currents 402, 404 of FIG. 4 during a start of a positive cycle (see FIG. 5A), at positive peak values (see FIG. 5B), and at negative peak values (see FIG. 5C). In this example, the power converter may be a two-phase interleaved totem pole PFC operating at 40 kHz.

Figure 3:
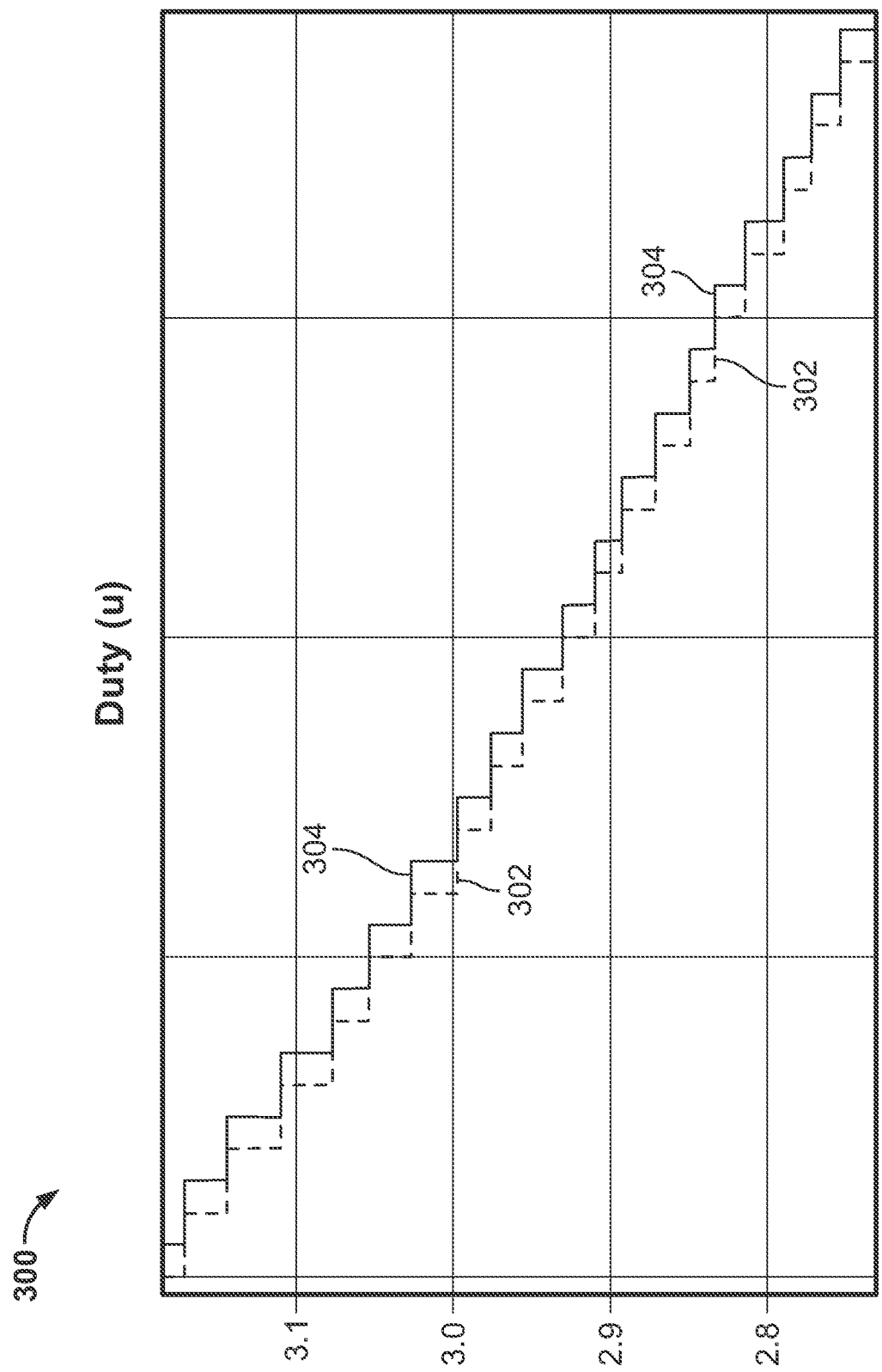
FIG. 3 is a graph showing duty cycle values for two subconverters when using conventional control techniques.

As shown in FIG. 3, the duty cycle value 304 for one of the subconverters is shifted and overcompensated relative to the duty cycle value 302 for the other subconverter. This causes an imbalance between the rail currents 402, 404 (e.g., inductor currents) in the subconverters as shown in FIGS. 4 and 5A-C.

However, and as further explained below, if the interpolation-based control methods are employed as disclosed herein, one of the duty cycles may be corrected to ensure the duty cycles track along the same path. As a result, balanced rail currents in the subconverters may be achieved.

The control circuit 110 of FIG. 1 may include various components for generating duty cycles to achieve balanced rail currents in the subconverters 102, 104. For example, FIG. 6 illustrates a current compensator 612 employable in the control circuit 110 for determining values of the duty cycles D1, D2 to balance rail currents in the subconverters 102, 104 over multiple periods (e.g., cycles). As shown in FIG. 6, the current compensator 612 includes comparators 620, 628, a controller 622, limiters 624, 634, a delay device 626, a multiplier 630, an adder 632, and PWM modules DPWM1, DPWM2.

In the example of FIG. 6, the current compensator 612 receives a current reference signal Tref and a sensed current Isense (e.g., an input current of the switching power converter 100 of FIG. 1). The current reference signal Tref may change from one periodic cycle to the next periodic cycle due to, for example, an input voltage of the switching power converter changing over time. The comparator 620 compares the current reference signal Tref and the sensed current Isense during one periodic cycle and generates a current error signal err_i based on the comparison (e.g., difference) between the current reference signal Tref and the sensed current Isense.

The controller 622 then generates a signal u(t) representing the duty cycle D1 for the periodic cycle based on the current error signal err_i. The signal u(t) is passed through the limiter 624 to limit the value of the signal u(t). In such examples, when the signal u(t) is less than a defined value, the signal u(t) may be forced to that defined value. If, however, the signal u(t) is greater than another defined value, the signal u(t) may be forced to the other defined value. The PWM module DPWM1 then generates a control signal PWM1 having a present value u(t) of the duty cycle D1 for controlling one or more power switches in a subconverter (e.g., the subconverter 102 of FIG. 1) during the periodic cycle.

The controller 622 of FIG. 6 is shown as including a proportional-integral (PI) controller. In such examples, the controller 622 may include one or more amplifiers for multiplying the current error signal err_i with a proportional gain coefficient and an integrator coefficient. In other examples, the controller 622 may include another suitable type of controller such as a proportional-integral-derivative (PID) controller.

As shown in FIG. 6, the comparator 628 compares the present value u(t) and a previous value u(t−1) of the duty cycle D1 and generates an error signal err based on the comparison (e.g., the difference) between the values. For example, and as shown in FIG. 6, the present value u(t) of the duty cycle D1 is passed through the delay device 626 to obtain the previous value u(t−1) of the duty cycle D1 from the previous periodic cycle.

The multiplier 630 receives the error signal err and a reference signal C1, and generates a signal based on the product of the error signal err and the reference signal C1. For example, the reference signal C1 may be a defined constant value based on a phase delay between the subconverters (e.g., the subconverters 102, 104) and the periodic cycle. For instance, if the switching power converters includes two interleaved subconverters, the phase delay between one subconverter and the other subconverter is 180 degrees and the periodic cycle is 360 degrees. In such examples, the reference signal C1 may be obtained by dividing the phase delay (e.g., 180) by the cycle (e.g., 360).

The adder 632 then adds the signal provided by the multiplier 630 and the present value u(t) of the duty cycle D1 to determine the duty cycle D2. For example, a signal u(t)' representing a present value of the duty cycle D2 is provided by the adder 632 and passed through the limiter 634, which functions in a similar manner as the limiter 624. The signal u(t)' representing the present value of the duty cycle D2 is then passed to the PWM module DPWM2. The PWM module DPWM2 generates a control signal PWM2 having the present value u(t)' of the duty cycle D2 for controlling one or more power switches in another subconverter (e.g., the subconverter 104 of FIG. 1) during the periodic cycle. The computations for determining the value of the signal u(t)' are shown in equation (1) below.

$$u(t)'=[(u(t)-u(t-1))*C1]+u(t) \qquad \text{Equation (1)}$$

The values of the signals u(t), u(t)' are time referenced. As such, the values of the signals u(t), u(t)' may be valid within one PWM period (e.g., one cycle). The signal values may be determined again in a similar manner as explained above for previous and/or subsequent PWM periods.

When the value of the signal u(t)' for the duty cycle D2 is determined as explained above, the duty cycles D1, D2 may track along the same path thereby forcing rail currents in the subconverters to balance. For example, FIG. 7 illustrates a graph 700 showing duty cycle values D1, D2 for two subconverters when using the current compensator 612 of FIG. 6. As shown in FIG. 7, the duty cycle values D1, D2 track along a similar path as the input voltage V changes.

In the particular example of FIGS. 6 and 7, the duty cycle D2 is corrected by half the error of the present value u(t) and the previous value u(t−1) of the duty cycle D1. As a result, the duty cycle D2 is computed to match the midpoint of the present value u(t) and a future value u(t+1) of the duty cycle D1. For example, if the input voltage is 95 volts at the previous cycle (e.g., V(t−1)), 100 volts at the present cycle (e.g., V(t)), and 105 volts at the future cycle (e.g., V(t+1)), the input voltage is 102.5 volts (e.g., V(t+0.5)) when the duty cycle D2 is computed to match the midpoint (e.g., u(t+0.5)) of the present value u(t) and the future value u(t+1) of the duty cycle D1.

As a result of the duty cycles D1, D2 tracking along a similar path, power switches may be controlled to achieve balanced current in the subconverters. For example, FIGS. 8, 9 and 10A-C illustrate graphs 800, 900, 1000A, 1000B, 1000C showing duty cycle values 802, 804 and rail currents Ia, Ib in two subconverters of a power converter employing the interpolation-based control methods disclosed herein. Specifically, the graph 800 illustrates the duty cycle values 802, 804 over time when an input voltage of the power converter is in its upward slope of one AC cycle, and the graph 900 illustrates the rail currents Ia, Ib (e.g., inductor currents) over two AC cycles. The graphs 1000a, 1000b, 1000c show enlarged portions of the rail currents Ia, Ib of FIG. 9 during a start of a positive cycle (see FIG. 10A), at positive peak values (see FIG. 10B), and at negative peak values (see FIG. 10C). In this example, the power converter may be a two-phase interleaved totem pole PFC operating at 40 kHz.

As shown in FIG. 8, the duty cycle values 802, 804 track along a similar path. As a result, the rail current Ia flowing through one of the subconverters (e.g., the subconverter 102 of FIG. 1) and the rail current Ib flowing through the other subconverter (e.g., the subconverter 104 of FIG. 1) are balanced, as shown in FIGS. 9 and 10A-C. Specifically, the rail currents Ia, Ib are phase synchronized, and have a similar wave shape and amplitude.

Although FIGS. 1 and 6 relate to interpolation-based control methods for controlling two interleaved subconverters in a power converter, it should be apparent that the methods may be used to control more than two interleaved subconverters. For example, FIG. 11 illustrates a current compensator 1112 employable for determining duty cycles D1, D2, D3 for balancing rail currents in the three subconverters. The current compensator 1112 of FIG. 11 is substantially similar to the current compensator 612 of FIG. 6 but includes another control loop for generating the duty cycle D3 for the third subconverter. For example, the current compensator 1112 of FIG. 11 includes the comparators 620, 628, the controller 622, the limiters 624, 634, the delay device 626, the multiplier 630, the adder 632, and the PWM modules DPWM1, DPWM2 of FIG. 6, and a multiplier 1130, an adder 1132, a limiter 1134 and a PWM module DPWM3.

The duty cycles D1, D2 are determined in the same manner as described above relative to FIG. 6. For example, during one periodic cycle, the duty cycle D1 (e.g., the signal u(t) representing the present value of the duty cycle D1) is determined based on current values of the reference signal Tref and the sensed current Isense, and the duty cycle D2 (e.g., the signal u(t)' representing the present value of the duty cycle D2) is determined based on the present value u(t) and the previous value u(t−1) of the duty cycle D1 as explained above.

In the example of FIG. 11, the multiplier 630 receives the error signal err from the comparator 628 and a reference signal C1, and generates a signal based on the product of the error signal err and the reference signal C1 as explained above. In the particular example of FIG. 11, the reference signal C1 is altered as compared to the reference signal C1 of FIG. 6. Specifically, the reference signal C1 of FIG. 11 is determined by dividing a phase delay between the first subconverter (e.g., a master subconverter) and the second subconverter (e.g., a slave subconverter) and the cycle (e.g., 360 degrees). In such examples, the phase delay between the first subconverter and the second subconverter is 120 degrees. Thus, in the particular example of FIG. 11, the reference signal C1 is 0.333 (e.g., 120/360).

Similar to the duty cycle D2, the duty cycle D3 for the third subconverter is determined based on the present value u(t) and the previous value u(t−1) of the duty cycle D1. For example, and as shown in FIG. 11, the multiplier 1130 receives the error signal err from the comparator 628 and a reference signal C2, and generates a signal based on the product of the error signal err and the reference signal C2.

The reference signal C2 may be a defined constant value determined in a similar manner as the reference signal C1. For example, the reference signal C2 may be determined based on a phase delay between the first subconverter (e.g., the master subconverter) and the third subconverter (e.g., a slave subconverter) and the cycle. In such examples, the phase delay between the first subconverter and the third subconverter is 240 degrees. As such, the reference signal C2 may be obtained by dividing the phase delay (e.g., 240) by the cycle (e.g., 360). Thus, in the particular example of FIG. 11, the reference signal C2 is 0.667 (e.g., 240/360).

The adder 1132 then adds the signal provided by the multiplier 1130 and the present value u(t) of the duty cycle D1 to determine a present value (e.g., a signal u(t)") of the duty cycle D3. The signal u(t)" representing the present value of the duty cycle D3 is passed through the limiter 1134, which functions in a similar manner as the limiter 634 explained above. The signal u(t)" is then passed to the PWM module DPWM3. The PWM module DPWM3 generates a control signal PWM3 having the present value u(t)" of the duty cycle D3 for controlling one or more power switches in the third subconverter during the periodic cycle. The computations for determining the value of the signal u(t)" are shown in equation (2) below.

$$u(t)''=[(u(t)-u(t-1))*C2]+u(t) \quad \text{Equation (2)}$$

In the particular example of FIG. 11, the duty cycle D2 is corrected by one third of the error of the present value u(t) and the previous value u(t−1) of the duty cycle D1 due to the reference signal C1. As a result, the duty cycle D2 is computed to match a point one third of the way between the present value u(t) and a future value u(t+1) of the duty cycle D1. Additionally, the duty cycle D3 is corrected by two thirds of the error of the present value u(t) and the previous value u(t−1) of the duty cycle D1 due to the reference signal C2. As such, the duty cycle D3 is computed to match a point two thirds of the way between the present value u(t) and a future value u(t+1) of the duty cycle D1.

The reference signals Iref disclosed herein may be generated based on an output of a voltage compensator. For example, FIG. 12 illustrates a control circuit 1210 for controlling power switches in two subconverters of a switching power converter (e.g., the switching power converter 100 of FIG. 1) to balance currents over multiple periods. As shown, the control circuit 1210 includes the current compensator 612 of FIG. 6 and a circuit 1212 for generating the current reference signal Tref for the current compensator 612.

In the example of FIG. 12, the current reference signal Tref is generated based on an input voltage Vin of the switching power converter, an output voltage Vo of the switching power converter, and a reference voltage Vref. For example, and as shown in FIG. 12, the circuit 1212 includes a comparator 1214, a multiplier 1216, and a power limit function 1218. The comparator 1214 compares the reference voltage Vref and the output voltage Vo and provides an output to the multiplier 1216. The output voltage Vo may pass through an optional zero-order hold (ZOH) device such as a sample and hold (S&H) circuit that samples the output voltage Vo (e.g., an analog signal) and holds its value at a constant level for a period of time (e.g., a sample interval) to generate a digital signal.

In some examples, the comparator 1214 may represent a voltage compensator. As such, the output of the comparator 1214 may be an output of the voltage compensator. In such examples, a controller (e.g., similar to the PI controller 622 of FIG. 6) may be coupled to the comparator 1214.

The power limit function 1218 receives the input voltage Vin of the power converter (e.g., a rectified input voltage), and provides an output to the multiplier 1216. For example, the power limit function 1218 may output a signal representing the inverse of the square of the average input voltage (e.g., 1/(average (Vin))^2, 1/Vacrms^2, etc.). Alternatively, the power limit function 1218 may output another signal if desired. Similar to the output voltage Vo, the input voltage Vin may pass through an optional ZOH device if desired.

The multiplier 1216 generates the current reference signal Tref based on the product of the output of the comparator 1214 (e.g., the output of the voltage compensator), the output of the power limit function 1218, and the input voltage Vin of the power converter. The current reference signal Tref is then passed to the comparator 620 of the current compensator 612, as explained above.

In the example of FIG. 12, the duty cycles of the PWM control signals PWM1, PWM2 may be determined using minimal sensors. For example, the duty cycles may be determined using a single current sensor, a single input voltage sensor, and a single output voltage sensor.

In some examples, the subconverters disclosed herein may include one or more inductors and/or PCB traces. In such examples, differing inductor values and/or PCB traces (e.g., mismatched resistances) may attribute to at least some of the current imbalance between the subconverters. However, if the interpolation-based control methods disclosed herein are employed, rail currents in the subconverters may be substantially balanced in amplitude and phase even with inductor values differing by ±10% and/or resistance values differing by ±10 milliohms.

For example, FIGS. 13A-16B illustrate graphs 1300A, 1300B 1400A, 1400B, 1500A, 1500B, 1600A, 1600B showing rail currents 1302, 1304, 1402, 1404, 1502, 1504, 1602, 1604 in inductors L1, L2. The inductor L1 may be coupled in a rail of one subconverter (e.g., a master subconverter such as the subconverter 102 of FIG. 1), and the inductor L2 may be coupled in a rail of another subconverter (e.g., a slave subconverter such as the subconverter 104 of FIG. 1). The graphs 1300B, 1400B, 1500B, 1600B of FIGS. 13B, 14B, 15B, 16B show enlarged portions of the rail currents 1302, 1304, 1402, 1404, 1502, 1504, 1602, 1604 of FIGS. 13A, 14A, 15A, 16A at their positive peak values. In the examples of FIGS. 13A-16B, the inductors L1, L2 have values differing by 10%. For example, the inductor L2 value is 90% of the inductor L1 value (e.g., L2=0.90*L1) in FIGS. 13A-B and 15A-B, and the inductor L2 value is 110% of the inductor L1 value (e.g., L2=1.1*L1) in FIGS. 14A-B and 16A-B.

As shown in FIGS. 13A-B and 14A-B, the 10% difference in inductance results in an imbalance between the currents 1302, 1402 in the inductor L1 and the currents 1304, 1404 in the inductor L2 when the interpolation control methods are not employed. However, and as shown in FIGS. 15A-B and 16A-B, if the interpolation control methods are employed, the 10% difference in inductance results in minimal imbalance between the currents 1502, 1602 in the inductor L1 and the currents 1504, 1604 in the inductor L2.

Additionally, FIGS. 17A-20B illustrate graphs 1700A, 1700B, 1800A, 1800B, 1900A, 1900B, 2000A, 2000B showing rail currents 1702, 1704, 1802, 1804, 1902, 1904, 2002, 2004 flowing through subconverters including resistors R1, R2. In some examples, the rail currents 1702, 1704, 1802, 1804, 1902, 1904, 2002, 2004 may represent inductor currents in the subconverters. The resistor R1 may represent a PCB trace in one subconverter (e.g., a master subconverter such as the subconverter 102 of FIG. 1), and the resistor R2 may represent a PCB trace in another subconverter (e.g., a slave subconverter such as the subconverter 104 of FIG. 1). The graphs 1700B, 1800B, 1900B, 2000B of FIGS. 17B, 18B, 19B, 20B show enlarged portions of the rail currents 1702, 1704, 1802, 1804, 1902, 1904, 2002, 2004 of FIGS. 17A, 18A, 19A, 20A at their positive peak values. In the examples of FIGS. 17A-20B, the resistors R1, R2 have values differing by 10 milliohms. For example, the resistor R2 value is 10 milliohms larger than the resistor R1 value (e.g., R2=R1+10 milliohms) in FIGS. 17A-B and 19A-B, and the resistor R1 value is 10 milliohms larger than the resistor R2 value (e.g., R1=R2+10 milliohms) in FIGS. 18A-B and 20A-B.

As shown in FIGS. 17A-B and 18A-B, the 10 milliohm difference between the resistors R1, R2 results in an imbalance between the currents 1702, 1802 flowing through the master subconverter and the currents 1704, 1804 flowing through the slave subconverter when the interpolation control methods are not employed. Specifically, the currents 1704, 1804 in the slave subconverter are larger than and leading the currents 1702, 1802 in the master subconverter. However, and as shown in FIGS. 19A-B and 20A-B, if the interpolation-based control methods are employed, the 10 milliohm resistive difference results in minimal imbalance between the currents 1902, 2002 flowing through the master subconverter and the currents 1904, 2004 flowing through the slave subconverter.

The interleaved multiphase switching power converters disclosed herein may include any suitable topology such as a buck, boost, buck-boost, totem-pole, etc. topology for providing AC/DC, DC/AC and/or DC/DC power conversion. In some preferred embodiments, the subconverters may be front-end stages in the switching power converters, and include, for example, AC/DC boost PFC power circuits, totem pole PFC power circuits, etc. operated at defined phase shifts and with average current mode control. In such examples, the power converters may have a power rating of 3000 W, more or less than 3000 W, etc.

For example, FIG. 21 illustrates an interleaved multiphase switching power converter 2100 including three interleaved subconverters 2102, 2104, 2106, and a control circuit 2108. The subconverters 2102, 2104, 2106 are coupled in parallel, and include inductors L1, L2, L3, diodes D1, D2, D3, and power switches S1, S2, S3, respectively. The inductors, the diodes and the power switches of the subconverters 2102, 2104, 2106 are arranged in PFC boost topologies. In some examples, the subconverter 2102 may be a master subconverter, and the subconverters 2104, 2106 may be slave subconverters.

The control circuit 2108 is coupled to the subconverters 2102, 2104, 2106 for controlling the power switches S1, S2, S3 to operate the subconverters 2102, 2104, 2106 at a 120-degree phase shift therebetween. The control circuit 2108 may include, for example, the current compensator 1112 of FIG. 11, the circuit 1212 of FIG. 12, or another suitable current compensator and/or voltage compensator for balancing rail currents in the subconverters 2102, 2104, 2106. In scenarios where the interleaved multiphase switching power converter 2100 includes only two subconverters (e.g., the subconverters 2102, 2104), the control circuit 2108 may include, for example, the current compensator 612 of FIG. 6 or another suitable current compensator for balancing rail currents.

As shown in FIG. 21, the switching power converter 2100 further includes a rectifier (e.g., a diode bridge rectifier, etc.) for rectifying an AC input voltage V_ac, a capacitor C3 coupled between the subconverters 2102, 2104, 2106 and the rectifier, and a capacitor C4 coupled between the subconverters 2102, 2104, 2106 and the converter's output. Additionally, the switching power converter 2100 includes an optional diode D4 (e.g., a bypass diode) coupled across the subconverters 2102, 2104, 2106 for rerouting current flow from the input to the output when the input voltage is greater than the output voltage. During this condition, energy in the inductors cannot transfer to the output. When the input voltage is less than the output voltage, the diode D4 is in its inactive state.

The control circuit 2108 may employ any one of the interpolation-based control methods disclosed herein to ensure rail currents passing through the inductors L1, L2, L3 are balanced. For example, the control circuit 2108 may determine a duty cycle D1 for the power switch S1 (e.g., of the master subconverter 2102) based on a sensed current Isense and a reference signal. The reference signal may be determined based on a sensed input voltage Vin and a sensed output voltage Vo, as explained above. The control circuit 2108 may also determine duty cycles D2, D3 for the power switches S2, S3 (e.g., of the slave subconverters 2104, 2106) based on present and previous values of the duty cycle D1 and constant reference signals (e.g., reference signals C1, C2 of FIG. 11), as explained above. The control circuit 2108 may then generate PWM control signals PWM1, PWM2, PWM3 having the duty cycle D1, D2, D3 for controlling the power switches S1, S2, S3, respectively.

In the example of FIG. 21, the signal Isense represents the combined current flowing through the subconverters 2102, 2104, 2106, and is generated by a single current sensor R1. Alternatively, a current sensor may be associated with each subconverter 2102, 2104, 2106 if desired. However, employing multiple current sensors increases components, and as a result, increases cost and complexity of the power converter 2100.

The control circuits disclosed herein may include an analog control circuit, a digital control circuit, or a hybrid control circuit (e.g., a digital control unit and an analog circuit). If, for example, the control circuit is a digital control circuit, the control circuit may be implemented with one or more hardware components and/or software. For example, instructions for performing any one or more of the features of the interpolation-based control methods disclosed herein may be stored in and/or transferred from a non-transitory computer readable medium, etc. to one or more existing digital control circuits, new digital control circuits, etc. In such examples, one or more of the instructions may be stored in volatile memory, nonvolatile memory, ROM, RAM, one or more hard disks, magnetic disk drives, optical disk drives, removable memory, non-removable memory, magnetic tape cassettes, flash memory cards, CD-ROM, DVDs, cloud storage, etc.

The digital control circuits may be implemented with one or more types of digital control circuitry. For example, the digital control circuits each may include a digital signal controller (DSC), a digital signal processor (DSP), a microcontroller unit (MCU), a field-programmable gate array (FPGA), an application-specific IC (ASIC), etc.

The power switches disclosed herein may include transistors and/or another suitable switching device. For example, the power switches may include metal-oxide-semiconductor field-effect transistors (MOSFETs) as shown in FIG. 21.

The interpolation-based control methods disclosed herein may be used to balance rail currents in two or more subconverters of an interleaved multiphase switching power converter. In some examples, it may be preferred to employ the interpolation-based control methods in switching power converters having two interleaved subconverters or three interleaved subconverters to minimize noise levels in the generated control signals. The control methods may be implemented at any suitable load and/or input range condition while maintaining balanced currents (e.g., phase synchronized, similar wave shapes, similar amplitudes, etc.) at all times.

Additionally, the interpolation-based control methods may be implemented in conjunction with average current mode control techniques without requiring additional sensors, calibration (or recalibration) of the control circuits, etc. Further, the implemented control methods require minimal computations for controlling the subconverters to balance their rail currents. In some examples, the control circuits may already include components for implementing the required computations. As such, the control methods have little effect on control loops in the control circuits. For example, a subtraction operation, a multiplier operation, an accumulation operation, and a min/max limit operation may be the only additional required computations for converters having two interleaved subconverters (e.g., a two-phase interleaved system). For converters having three or more interleaved subconverters, the required computations may include the abovementioned operations for the two interleaved subconverters, and a multiplier operation, an accumulation operation, and a min/max limit operation for each additional rail.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A switching power converter comprising:
a first subconverter having a power switch;
a second subconverter having a power switch;
a current compensator configured to:
determine a first duty cycle based on a reference signal and a sensed current in the switching power converter;
generate a first PWM control signal having a present value of the first duty cycle:
control the power switch of the first subconverter via the first PWM control signal during one period;
determine a second duty cycle based on the present value of the first duty cycle and a previous value of the first duty cycle;
generate a second PWM control signal having the second duty cycle; and
control the power switch of the second subconverter via the second PWM control signal during the one period.

2. The switching power converter of claim 1, wherein the current compensator is configured to generate an error signal based on a comparison between the present value of the first duty cycle and the previous value of the first duty cycle for determining the second duty cycle.

3. The switching power converter of claim 2, wherein the reference signal is a first reference signal, and wherein the current compensator is configured to generate a signal based on the product of the error signal and a second reference signal for determining the second duty cycle.

4. The switching power converter of claim 3, wherein the second reference signal is determined by dividing a phase delay between the first subconverter and the second subconverter by 360 degrees.

5. The switching power converter of claim 3, wherein the current compensator is configured to add the signal to the present value of the first duty cycle to determine the second duty cycle.

6. The switching power converter of claim 1, wherein the current compensator includes a voltage compensator configured to generate the reference signal based on an input voltage of the switching power converter, an output voltage of the switching power converter, and a reference voltage.

7. The switching power converter of claim 1, wherein:
the reference signal is a first reference signal;
the switching power converter further comprises a third subconverter having a power switch;
the third subconverter is phase shifted relative to the second subconverter and the first subconverter; and
the current compensator is configured to:
determine a third duty cycle based on the present value of the first duty cycle, the previous value of the first duty cycle, and a second reference signal;
generate a third PWM control signal having the third duty cycle; and
control the power switch of the third subconverter via the third PWM control signal during the one period.

8. The switching power converter of claim 7, wherein the second reference signal is determined by dividing a phase delay between the first subconverter and the third subconverter by 360 degrees.

9. The switching power converter of claim 1, wherein the current compensator is configured to control the power switch of the first subconverter and the power switch of the second subconverter with average current mode control.

10. The switching power converter of claim 1, wherein the current compensator includes a digital controller.

11. The switching power converter of claim 1, wherein the first subconverter and the second subconverter include PFC boost topologies.

12. A method for controlling a switching power converter, the interleaved multiphase switching power converter including a first subconverter having a power switch and a second subconverter having a power switch, the method comprising:
determining a first duty cycle based on a reference signal and a sensed current in the switching power converter;
generating a first PWM control signal having a present value of the first duty cycle:
controlling the power switch of the first subconverter via the first PWM control signal during one period;
determining a second duty cycle based on the present value of the first duty cycle and a previous value of the first duty cycle;
generating a second PWM control signal having the second duty cycle; and
controlling the power switch of the second subconverter via the second PWM control signal during the one period.

13. The method of claim 12 further comprising controlling the power switch of the first subconverter and the power switch of the second subconverter with average current mode control.

14. The method of claim 12, wherein the first subconverter and the second subconverter include PFC boost topologies.

15. The method of claim 12 further comprising generating an error signal based on a comparison between the present value of the first duty cycle and the previous value of the first duty cycle for determining the second duty cycle.

16. The method of claim 15, wherein the reference signal is a first reference signal; and
further comprising generating a signal based on the product of the error signal and a second reference signal for determining the second duty cycle.

17. The method of claim 16 further comprising determining the second reference signal by dividing a phase delay between the first subconverter and the second subconverter by 360 degrees.

18. The method of claim 16 further comprising adding the signal to the present value of the first duty cycle to determine the second duty cycle.

19. The method of claim 12, wherein the reference signal is a first reference signal; and further comprising:
- determining a third duty cycle based on the present value of the first duty cycle, the previous value of the first duty cycle, and a second reference signal;
- generating a third PWM control signal having the third duty cycle; and
- controlling a power switch of a third subconverter of the switching power converter during the one period.

20. The method of claim 19 further comprising determining the second reference signal by dividing a phase delay between the first subconverter and the third subconverter by 360 degrees.

* * * * *